United States Patent
Yoshida et al.

(10) Patent No.: US 9,144,996 B2
(45) Date of Patent: Sep. 29, 2015

(54) CONTROLLING DEVICE

(75) Inventors: Yasunari Yoshida, Aichi-ken (JP); Shintaro Izoe, Kiyosu (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 248 days.

(21) Appl. No.: 12/973,286

(22) Filed: Dec. 20, 2010

(65) Prior Publication Data
US 2011/0148966 A1    Jun. 23, 2011

(30) Foreign Application Priority Data
Dec. 22, 2009   (JP) .................................. 2009-291083

(51) Int. Cl.
   B41J 2/21       (2006.01)
   G06K 15/10      (2006.01)

(52) U.S. Cl.
   CPC .............. B41J 2/2103 (2013.01); B41J 2/2128 (2013.01); G06K 15/105 (2013.01)

(58) Field of Classification Search
   CPC ................................................ B41J 2/2139
   USPC ........................................................... 347/14
   See application file for complete search history.

(56) References Cited

U.S. PATENT DOCUMENTS

| 5,809,177 | A * | 9/1998 | Metcalfe et al. ............... 382/251 |
| 5,946,011 | A * | 8/1999 | Kanaya ............................. 347/41 |
| 5,953,459 | A * | 9/1999 | Ueda et al. ..................... 382/237 |
| 6,203,134 | B1 * | 3/2001 | Kakutani et al. ................. 347/15 |
| 7,290,845 | B2 * | 11/2007 | Tanaka ............................ 347/15 |
| 2002/0027572 | A1 | 3/2002 | Kato et al. |
| 2002/0075494 | A1 | 6/2002 | Kakutani |
| 2005/0179711 | A1 | 8/2005 | Yoshida |
| 2006/0066927 | A1 | 3/2006 | Tanaka |
| 2006/0170973 | A1 | 8/2006 | Takahashi |

(Continued)

FOREIGN PATENT DOCUMENTS

| JP | H05-30361 A | 2/1993 |
| JP | 11-58704 | 3/1999 |

(Continued)

OTHER PUBLICATIONS

Japanese Official Action dated Sep. 3, 2013 received in related application JP 2009-291083.

(Continued)

*Primary Examiner* — Manish S Shah
*Assistant Examiner* — Jeffrey C Morgan
(74) *Attorney, Agent, or Firm* — Scully, Scott, Murphy & Presser, P.C.

(57) ABSTRACT

A controlling device may perform an image process on specific image data so as to generate processed image data, supply the processed image data to the print performing unit and perform, in order to compensate variability of discharging amount of ink droplets discharged from the plurality of nozzles, a specific process on a target pixel within target image data using correction data for a target nozzle which forms a dot at a position on a print medium corresponding to the target pixel. The correction data may be data acquired using two or more sets of characteristic data corresponding to two or more nozzles of the plurality of nozzles. The two or more nozzles may include the target nozzle and a specific nozzle. The specific nozzle may be to form a raster near a target raster formed on the print medium by the target nozzle.

10 Claims, 12 Drawing Sheets

(56) References Cited

U.S. PATENT DOCUMENTS

| | | | |
|---|---|---|---|
| 2007/0008355 A1 | 1/2007 | Miyamoto et al. | |
| 2007/0058202 A1* | 3/2007 | Kakutani | 358/3.06 |
| 2008/0079960 A1* | 4/2008 | Yamazaki | 358/1.8 |
| 2009/0051944 A1 | 2/2009 | Bracke et al. | |
| 2010/0060691 A1 | 3/2010 | Tanase et al. | |
| 2010/0309243 A1 | 12/2010 | Nakano et al. | |
| 2011/0033124 A1 | 2/2011 | Kuno | |
| 2011/0148966 A1 | 6/2011 | Yoshida et al. | |

FOREIGN PATENT DOCUMENTS

| | | |
|---|---|---|
| JP | 2000-25212 | 1/2000 |
| JP | 2000-99716 | 4/2000 |
| JP | 2001-38892 | 2/2001 |
| JP | 2001-157055 A | 6/2001 |
| JP | 2003-200613 A | 7/2003 |
| JP | 2005-138500 A | 6/2005 |
| JP | 2005-225199 | 8/2005 |
| JP | 2006-315411 A | 11/2006 |
| JP | 2007-015336 A | 1/2007 |
| JP | 2007-019652 A | 1/2007 |
| JP | 2007-237398 A | 9/2007 |
| JP | 2011-131428 | 7/2011 |
| JP | 2011-131473 | 7/2011 |

OTHER PUBLICATIONS

United States Office Action dated Dec. 6, 2013 received in related U.S. Appl. No. 13/429,659.

United States Notice of Allowance dated Apr. 18, 2014 received in U.S. Appl. No. 13/429,659.

Japanese Office Action dated Jun. 30, 2015 issued in JP 2011-202653.

* cited by examiner

FIG. 3

Characteristic Data Table 60

| Nozzle Number | Characteristic Data |
|---|---|
| Nk1 | 6 |
| Nk2 | 3 |
| Nk3 | 1.5 |
| Nk4 | 1.5 |
| ⋮ | ⋮ |
| Nkn-1 | 5 |
| Nkn | 7 |

| Nozzle Number | Characteristic Data |
|---|---|
| Nc1 | 5 |
| Nc2 | 3 |
| Nc3 | 2 |
| Nc4 | 0 |
| ⋮ | ⋮ |
| Ncn-1 | 0 |
| Ncn | 2 |

| Nozzle Number | Characteristic Data |
|---|---|
| Nm1 | 8 |
| Nm2 | 0 |
| Nm3 | 3 |
| Nm4 | 2 |
| ⋮ | ⋮ |
| Nmn-1 | 3 |
| Nmn | 8 |

| Nozzle Number | Characteristic Data |
|---|---|
| Ny1 | 3 |
| Ny2 | 3 |
| Ny3 | 0.5 |
| Ny4 | 0 |
| ⋮ | ⋮ |
| Nyn-1 | 1.5 |
| Nyn | 1 |

FIG. 8

Converted RGB Image Data 200

| 201 | 202 | | |
|---|---|---|---|
| (i−1,j−1)<br>R(i−1,j−1)<br>G(i−1,j−1)<br>B(i−1,j−1) | (i,j−1)<br>R(i,j−1)<br>G=(i,j−1)<br>B=(i,j−1) | (i+1,j−1)<br>R(i+1,j−1)<br>G(i+1,j−1)<br>B(i+1,j−1) | (i+2,j−1)<br>R(i+2,j−1)<br>G(i+2,j−1)<br>B(i+2,j−1) |
| (i−1,j)<br>R(i−1,j)<br>G(i−1,j)<br>B(i−1,j) | (i,j)<br>R(i,j)<br>G(i,j)<br>B(i,j) | (i+1,j)<br>R(i+1,j)<br>G(i+1,j)<br>B(i+1,j) | (i+2,j)<br>R(i+2,j)<br>G(i+2,j)<br>B(i+2,j) |

CMYK Image Data 210

| 211 | 212 | | |
|---|---|---|---|
| (i−1,j−1)<br>C(i−1,j−1)<br>M(i−1,j−1)<br>Y(i−1,j−1)<br>K(i−1,j−1) | (i,j−1)<br>C(i,j−1)<br>M(i,j−1)<br>Y(i,j−1)<br>K(i,j−1) | (i+1,j−1)<br>C(i+1,j−1)<br>M(i+1,j−1)<br>Y(i+1,j−1)<br>K(i+1,j−1) | (i+2,j−1)<br>C(i+2,j−1)<br>M(i+2,j−1)<br>Y(i+2,j−1)<br>K(i+2,j−1) |
| (i−1,j)<br>C(i−1,j)<br>M(i−1,j)<br>Y(i−1,j)<br>K(i−1,j) | (i,j)<br>C(i,j)<br>M(i,j)<br>Y(i,j)<br>K(i,j) | (i+1,j)<br>C(i+1,j)<br>M(i+1,j)<br>Y(i+1,j)<br>K(i+1,j) | (i+2,j)<br>C(i+2,j)<br>M(i+2,j)<br>Y(i+2,j)<br>K(i+2,j) |

Correction Data Table 300

| Nozzle Number | Correction Data |
|---|---|
| Nk1 | 259 |
| Nk2 | 258 |
| Nk3 | 256.5 |
| Nk4 | 256.5 |
| ⋮ | ⋮ |
| Nkn-1 | 255 |
| Nkn | 256.5 |

| Nozzle Number | Correction Data |
|---|---|
| Nc1 | 257 |
| Nc2 | 258 |
| Nc3 | 257 |
| Nc4 | 255 |
| ⋮ | ⋮ |
| Ncn-1 | 256.5 |
| Ncn | 256.5 |

| Nozzle Number | Correction Data |
|---|---|
| Nm1 | 259 |
| Nm2 | 255 |
| Nm3 | 258 |
| Nm4 | 257 |
| ⋮ | ⋮ |
| Nmn-1 | 257 |
| Nmn | 257 |

| Nozzle Number | Correction Data |
|---|---|
| Ny1 | 256.5 |
| Ny2 | 258 |
| Ny3 | 256.5 |
| Ny4 | 255 |
| ⋮ | ⋮ |
| Nyn-1 | 256 |
| Nyn | 256 |

CONTROLLING DEVICE

CROSS-REFERENCE TO RELATED APPLICATIONS

This application claims priority to Japanese Patent Application No. 2009-291083, filed on Dec. 22, 2009, the contents of which are hereby incorporated by reference into the present application.

TECHNICAL FIELD

The present specification discloses a technique for causing a print performing unit to perform print. The print performing unit comprises a print head in which a plurality of nozzles for discharging ink droplets is formed.

DESCRIPTION OF RELATED ART

Many ink jet printers perform an image process (e.g., a halftone process) on CMYK image data that includes a plurality of pixels written in CMYK format so as to create processed image data that includes a plurality of pixels written in binary (no dot, with dot) or ternary or greater (no dot, small dot, medium dot, large dot, etc.). For each of a plurality of pixels within the processed image data, the ink jet printer forms a dot in accordance with the value of the pixel at a position on a print medium corresponding to the pixel. An image represented by the processed image data is thereby formed on the print medium.

There is an ink jet printer which stores characteristic data related with a discharging amount of an ink droplet discharged from each of a plurality of nozzles formed in a print head. Specifically, the characteristic data is data showing a percentage of increase or decrease from a predetermined aimed discharging amount. This ink jet printer corrects CMYK image data using the characteristic data of the nozzles. For example, if a K value of a specific pixel within the CMYK image data is K1, and the characteristic data of a nozzle that forms a dot at a position on the print medium corresponding to the specific pixel is X %, the K value of the specific pixel is corrected using the formula K1×(100%−X %). The aforementioned correction is performed for each pixel within the CMYK image data. The ink jet printer performs a halftone process on the corrected CMYK image data. Consequently, processed image data is generated in which variability in the discharging amounts of ink droplets discharged from the plurality of nozzles (may be simply termed "discharging amount variability" below) is compensated.

SUMMARY

Improving image quality of an image printed on a print medium is desired. The present application provides a technique for printing with high image quality.

The technique taught by the present specification is a controlling device for causing a print performing unit to perform print. The print performing unit may comprise a print head in which a plurality of nozzles for discharging ink droplets of a specific color is formed. The controlling device may comprise an image process unit and a supplying unit. The image process unit may be configured to perform an image process on specific image data so as to generate processed image data. The supplying unit may be configured to supply the processed image data to the print performing unit. In order to compensate for variability of discharging amounts of ink droplets discharged from the plurality of nozzles, the image process unit may be configured to perform a specific process on a target pixel within target image data using correction data for a target nozzle which forms a dot at a position on a print medium corresponding to the target pixel. The correction data may be data acquired using two or more sets of characteristic data corresponding to two or more nozzles which are a part of the plurality of nozzles. The two or more nozzles may include the target nozzle and a specific nozzle. The specific nozzle is to form a raster near a target raster formed on the print medium by the target nozzle. Each set of the characteristic data may be data related with a discharging amount of an ink droplet of a corresponding nozzle.

Incidentally, a control method, a computer program and a non-transitory recording medium storing such a computer program for realizing the controlling device are also novel and useful.

BRIEF DESCRIPTION OF THE DRAWINGS

FIG. 3 shows a characteristic data table.
FIG. 8 shows pixels within converted RGB image data.
FIG. 9 shows pixels within CMYK image data.
FIG. 17 shows a correction data table of a variant.

EMBODIMENT

First Embodiment (Configuration of System)

Figure 1:
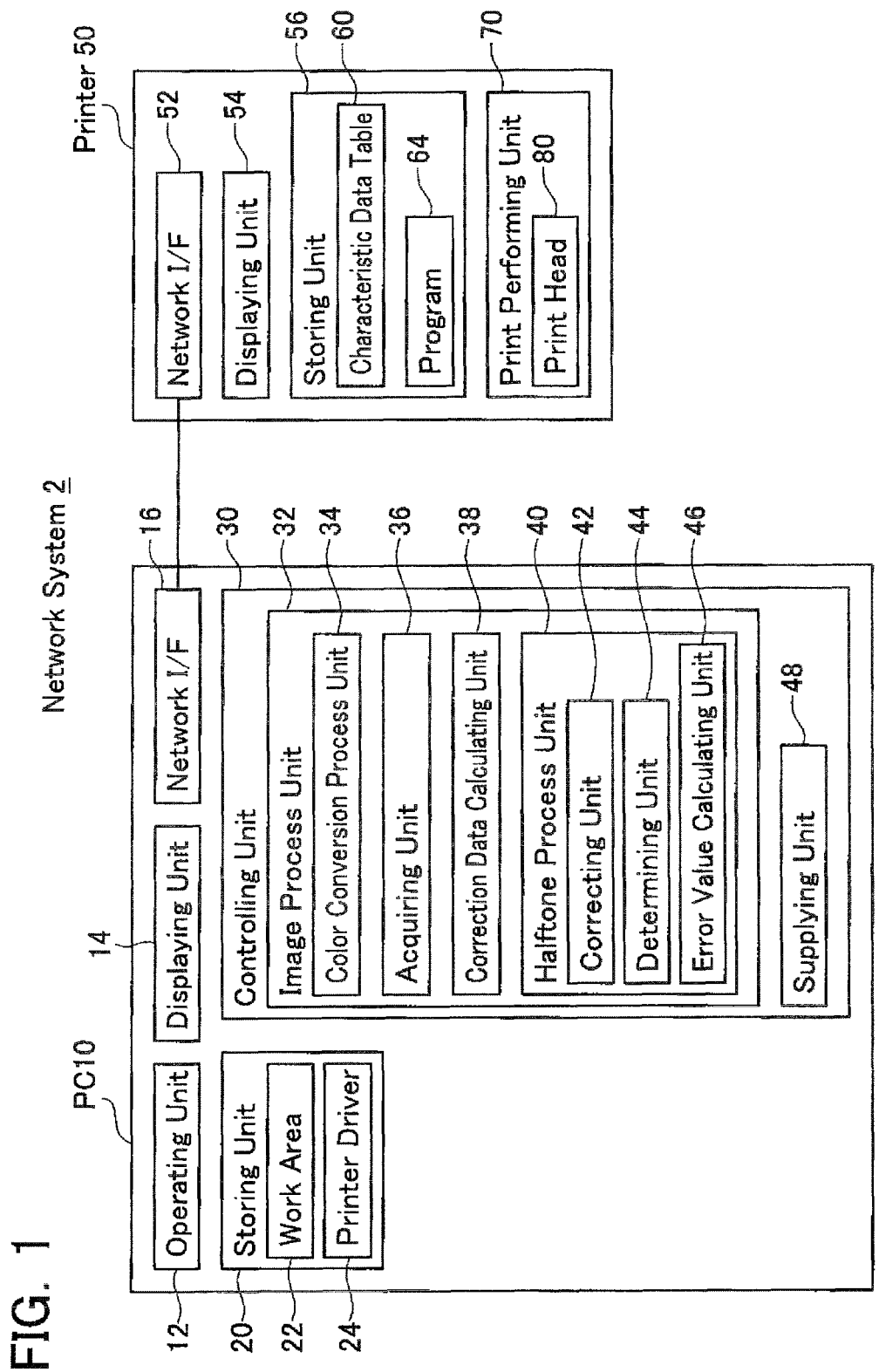
FIG. 1 shows a configuration of a network system.

A first embodiment will be described with reference to figures. As shown in FIG. 1, a network system 2 comprises a LAN 4, a PC 10, and a printer 50. The PC 10 and the printer 50 are connected to the LAN 4. The PC 10 and the printer 50 can communicate with one another via the LAN 4.

(Configuration of PC 10)

The PC 10 comprises an operating unit 12, a displaying unit 14, a network interface 16, a storing unit 20, and a controlling unit 30. The operating unit 12 comprises a mouse and a keyboard. A user can input various instructions to the PC 10 by operating the operating unit 12. The displaying unit 14 is a display for showing a variety of information. The network interface 16 is connected to the LAN 4.

The storing unit 20 comprises a work area 22. The work area 22 stores, e.g., print target data. For example, the print target data may be data generated by an application within the PC 10, or may be data acquired from an external device.

Examples of the application within the PC 10 are word processing software, spreadsheet software, etc. Examples of the external device are a server on the internet, a device connected to the LAN 4, a portable storage medium, etc. The storing unit 20 further stores a printer driver 24 for the printer 50. The printer driver 24 is software for sending various instructions (e.g., a print instruction) to the printer 50. The printer driver 24 may, e.g., be installed on the PC 10 from a non-transitory computer readable medium storing the printer driver 24, or may be installed on the PC 10 from a server on the internet.

The controlling unit 30 performs various processes in accordance with a program (e.g., the printer driver 24) stored in the storing unit 20. The controlling unit 30 realizes the functions of an image process unit 32 and a supplying unit 48 by performing processes in accordance with the printer driver 24. The image process unit 32 comprises a color conversion process unit 34, an acquiring unit 36, a correction data calculating unit 38, and a halftone process unit 40. The halftone process unit 40 comprises a correcting unit 42, a determining unit 44, and an error value calculating unit 46.

(Configuration of Printer 50)

The printer 50 comprises a network interface 52, a displaying unit 54, a storing unit 56, and a print performing unit 70. The network interface 52 is connected to the LAN 4. The displaying unit 54 is a display for showing various information. The print performing unit 70 prints, onto a print medium, an image represented by binary data supplied from the PC 10 in accordance with a program 64 stored in the storing unit 56. The print performing unit 70 comprises a print head 80. In addition to the print head 80, the print performing unit 70 comprises a drive mechanism of the print head 80, and a print medium transporting device, etc. (neither is shown).

The drive mechanism of the print head 80 comprises a carriage and a motor that moves the carriage. The print head 80 is mounted removably on the carriage. The carriage moves back and forth in a predetermined direction within a casing of the printer 50. When the carriage moves, the print head 80 also moves. The direction of back and forth movement of the carriage, i.e., the direction of back and forth movement of the print head 80 is termed a "main scan direction." Further, in the present embodiment, one back and forth reciprocal movement of the print head 80 is termed "one main scan." The drive mechanism of the print head 80 further comprises a circuit for supplying a driving signal to the print head 80. When the driving signal is supplied to the print head 80, ink droplets are discharged from a nozzle group 84k, etc. (FIG. 2) formed in the print head 80. In the present embodiment, a driving signal to discharge ink droplets from the nozzle group 84k, etc. is supplied to the print head 80 during an outgoing stroke of one main scan. Moreover, ink droplets are not discharged from the nozzle group 84k, etc. during a returning stroke of the one main scan. The print medium transporting device transports the print medium in a direction orthogonal to the main scan direction. The transport direction of the print medium is termed a "sub scan direction." In other embodiments, driving signals may be supplied to the print head 80 in order to discharge ink droplets from the nozzle group 84k, etc. during both the outgoing stroke and the returning stroke of one back and forth movement of the print head 80. In this case, each of the outgoing stroke and the returning stroke of one back and forth movement of the print head 80 can be called "one main scan."

Figure 2:
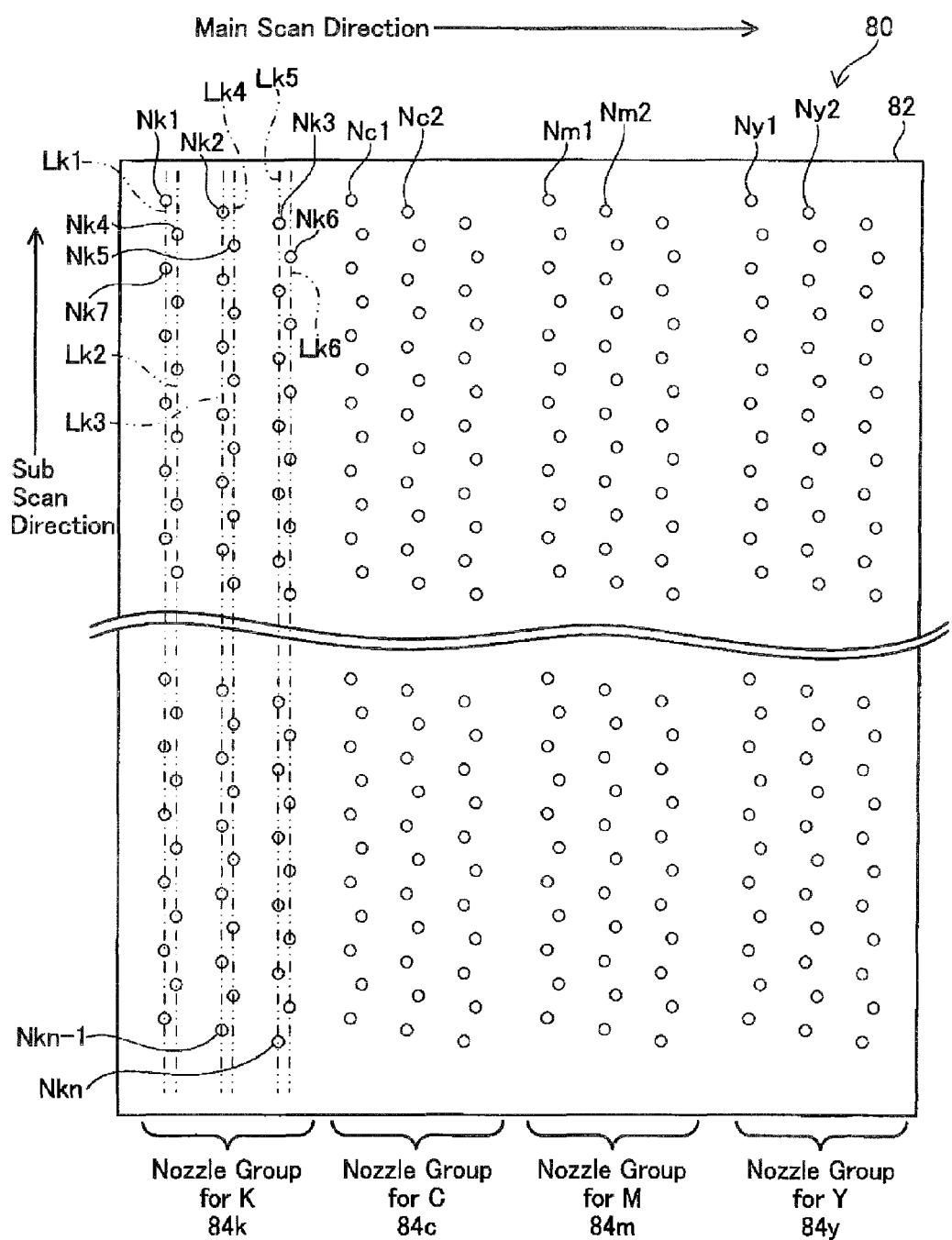
FIG. 2 shows a plan view of a nozzle face of a print head.

As shown in FIG. 2, the print head 80 comprises a nozzle face 82 formed three sets of nozzle groups 84c, 84m, 84y for discharging ink droplets of three types of chromatic color (cyan, magenta, yellow), and one set of nozzle group 84k for discharging black ink droplets. The nozzle group for K 84k includes n (n is an integer number of two or more) nozzles for K. The nozzle group for K 84k forms six nozzle rows Lk1 to Lk6 extending in the sub scan direction. The n nozzles for K of the nozzle group for K 84k belong to one of the six nozzle rows Lk1, etc. For Example, the nozzles for K Nk1, Nk7, etc. belong to the nozzle row Lk1, the nozzle for K Nk4, etc. belongs to the nozzle row Lk2, and the nozzle for K Nk2, etc. belongs to the nozzle row Lk3. Between two adjacent nozzles for K belonging to one nozzle row (e.g., the nozzle for K Nk1 and the nozzle for K Nk7 belonging to the nozzle row Lk1), five nozzles for K (e.g., NK2 to NK6) belonging to the other five nozzle rows are positioned in the sub scan direction. In the present specification, in the nozzle group for K 84k, "Nk1" has been adopted as the reference number of the nozzle for K present at the most downstream side (the upper side in FIG. 2) of the sub scan direction, and the reference number of the nozzles for K increases (e.g., Nk2, Nk3 . . . ) the more it approaches the upstream side (the lower side in FIG. 2) of the sub scan direction.

The nozzle groups 84; etc. corresponding to the other colors each have a configuration identical to that of the nozzle group for K 84k. Consequently, 4n nozzles in total are formed in the nozzle face 82. Below, all the nozzles that discharge the four colors of ink droplets CMYK are termed "4n nozzles." The reference numbers are set for the other color nozzle groups 84c, etc. as in the case of the nozzle group for K 84k. Since the four nozzle groups 84k, etc. have the same configuration, the four nozzles corresponding to the four colors CMYK are disposed in the same position in the sub scan direction. For Example, in the sub scan direction, the four nozzles Nk1, Nc1, Nm1, Ny1 are disposed in the same position, and the four nozzles Nk2, Nc2, Nm2, Ny2 are disposed in the same position.

The storing unit 56 stores a characteristic data table 60 and the program 64. The program 64 includes a program for the print performing unit 70 to perform print. As shown in FIG. 3, for each of the 4n nozzles formed in the print head 80, an association of nozzle number of the nozzle and characteristic data related with the discharging amount of the ink droplet discharged from the nozzle is registered in the characteristic data table 60. In the characteristic data table 60 of FIG. 3, the reference number of the nozzle (Nk1, etc. of FIG. 2) has been adopted as the nozzle number of the nozzle. For example, the characteristic data "6" corresponding to the nozzle number Nk1 shows the characteristic data of the nozzle for K Nk1 (FIG. 2) for discharging black ink droplet. The characteristic data registered in the characteristic data table 60 is examined beforehand by the manufacturer of the printer 50. Specifically, the characteristic data has been examined by the following method.

Although not shown, the print head 80 comprises an actuator unit for discharging ink droplets from the 4n nozzles. The actuator unit comprises 4n individual electrodes corresponding to the 4n nozzles. When the driving signal is supplied to the individual electrode, one ink droplet is discharged from the nozzle corresponding to the individual electrode. The manufacturer of the printer 50 supplies one driving signal to each of the n individual electrodes corresponding to the n nozzles for K belonging to the nozzle group for K 84k. Moreover, the n driving signals supplied here are identical signals. When the n driving signals are supplied, n black ink droplets are discharged from the n nozzles for K toward a predetermined medium. Consequently, n black dots corresponding to the n nozzles for K are formed on the predetermined medium.

For each of the n black dots, the manufacturer measures the density of the dot (e.g., the concentration of black per unit area). The manufacturer determines that, in the nozzle group for K 84k, the density of a specific black dot with lowest density has the greatest value "255" of the 256 tone levels. Next, the manufacturer specifies the density of the other dots formed by the nozzles for K using the density of the specific black dot having the lowest density as a standard thereof. Consequently, the density of the dots formed by the other nozzles for K is specified as a value equal to or above 255. Next, the manufacturer determines the characteristic data of the nozzles for K based on the difference between the density of the dots formed by the nozzles for K, and the density of the specific black dot with the lowest density (i.e. 255). Consequently, in the present embodiment, the characteristic data of the nozzle for K that forms the specific dot having the lowest density is determined to be zero. The characteristic data of the other nozzles for K is determined to have a value of zero or more. For example, the characteristic data corresponding to the nozzle number Nk1 shown in FIG. 3 is "6." This means that the difference is "6" between the density of the dot (261) formed by the nozzle for K Nk1, and the density of the specific dot (255) having the lowest density. The manufacturer also determines the characteristic data of each nozzle for cyan, magenta, and yellow in the same manner as for black. For example, the manufacturer determines that, in the nozzle group for C 84c, a specific dot having the lowest density formed by a specific nozzle for C has the characteristic data zero. Further, the manufacturer determines the characteristic data of the other nozzles for C based on the difference between the density of the cyan dots formed by the other nozzles for C and the density of the aforementioned specific dot. The manufacturer generates the characteristic data table 60 based on the examination results, and stores the characteristic data table 60 in the storing unit 56. The printer 50 is already storing the characteristic data table 60 at the shipment stage.

(Print Mode)

Next, a print mode by which the print performing unit 70 of the printer 50 can be operated will be described. The image process unit 32 (FIG. 1) of the PC 10 performs a binary data generating process (FIG. 7; to be described) so as to generate binary data. If the user has designated a first print resolution (e.g., 300 dpi), the image process unit 32 generates binary data corresponding to the first print resolution. If the user has designated a second print resolution higher than the first print resolution (e.g., 600 dpi), the image process unit 32 of the PC 10 generates binary data corresponding to the second print resolution. The supplying unit 48 (FIG. 1) of the PC 10 sends the binary data generated by the image process unit 32 to the printer 50. If the binary data corresponding to the first print resolution is supplied from the PC 10, the print performing unit 70 of the printer 50 operates in a first print mode. Alternatively, if the binary data corresponding to the second print resolution is supplied from the PC 10, the print performing unit 70 operates in a second print mode.

(First Print Mode)

Figure 4:
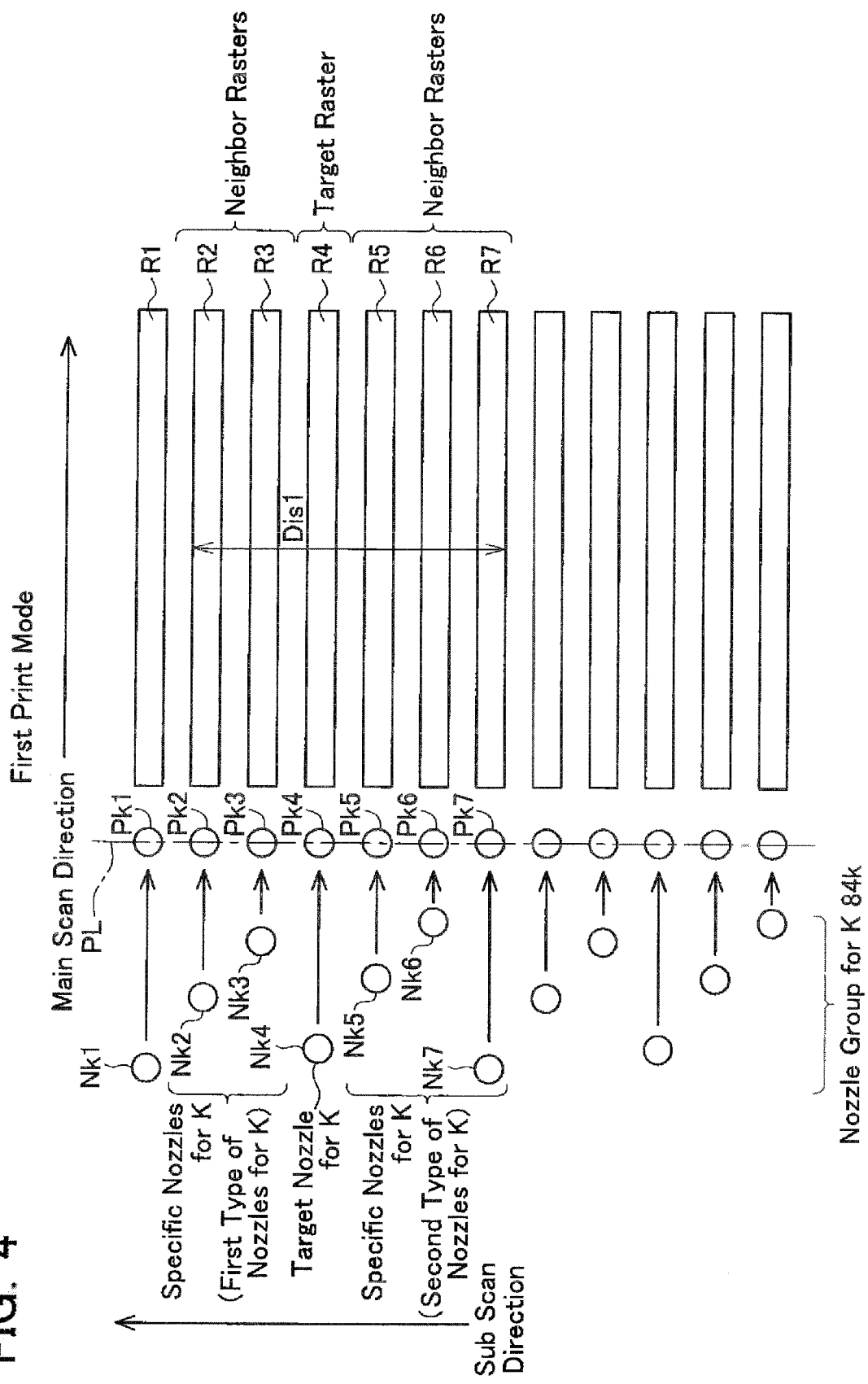
FIG. 4 shows a raster group formed in a first print mode.

In a case where a projection line PL extending in the sub scan direction is set, Pk1, Pk2, etc. shown in FIG. 4 show projection points obtained by projecting, in the main scan direction, the nozzles for K Nk1, Nk2, etc. that constitute the nozzle group for K 84k. Based on the binary data, the print performing unit 70 discharges ink droplets from the nozzles for K Nk1, etc. during one main scan of the print head 80. Consequently, e.g., a plurality of black dots aligned in the main scan direction are formed on the print medium by a plurality of black ink droplets discharged from the nozzle for K Nk1. Similarly, another plurality of black dots aligned in the main scan direction are formed on the print medium by a plurality of black ink droplets discharged from the nozzle for K Nk2. In the case of black and white printing, an alignment of a plurality of black dots formed by one nozzle for K in one main scan of the print head 80 is termed "one raster." Consequently, each raster extends along the main scan direction. In the case of black and white printing, e.g., seven nozzles for K Nk1 to Nk7 form seven rasters R1 to R7 in one main scan of the print head 80 respectively.

As described above, e.g., the nozzle Nk1, nozzle Nc1, nozzle Nm1, and nozzle Ny1 are disposed in the same position in the sub scan direction (FIG. 2). Consequently, in the case of color printing, the four nozzles Nk1, Nc1, Nm1, Ny1 form a dot in the same position in the sub scan direction in one main scan of the print head 80. Consequently, in the case of color printing, an alignment of a plurality of CMYK dots formed by the four nozzles Nk1, Nc1, Nm1, Ny1 in one main scan of the print head 80 is termed "one raster."

In the first print mode, n rasters are formed along the sub scan direction during a first main scan of the print head 80. When the first main scan of the print head 80 ends, the print performing unit 70 transports the print medium. In the first print mode, a first distance is adopted as the transportation distance. The first distance is the distance of n nozzle pitches. One nozzle pitch is the distance between two adjacent nozzles (e.g., Nk1 and Nk2) in the sub scan direction. I.e., one nozzle pitch is the distance between two adjacent projection points (e.g., Pk1 and Pk2). Next, the print performing unit 70 performs a second main scan of the print head 80. N rasters are thereby newly formed. The print performing unit 70 repeats the combination of transporting the print medium by the first distance and performing the main scan of the print head 80. An image represented by the binary data is thereby printed on the print medium.

As is clear from the above description, in the first print mode, the distance between two adjacent rasters is approximately one nozzle pitch. The aforementioned first print resolution refers to the print resolution in the sub scan direction. That is, the first print resolution can also be expressed as "a print resolution that the distance between two adjacent rasters is approximately one nozzle pitch."

(Second Print Mode)

Figure 5:
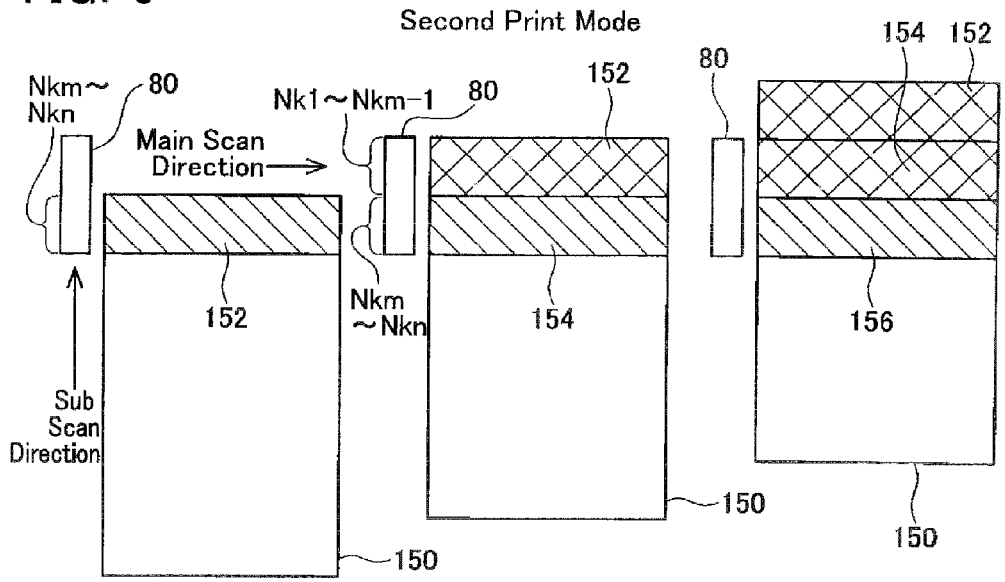
FIG. 5 shows how a print medium is transported in a second print mode.
Figure 6:
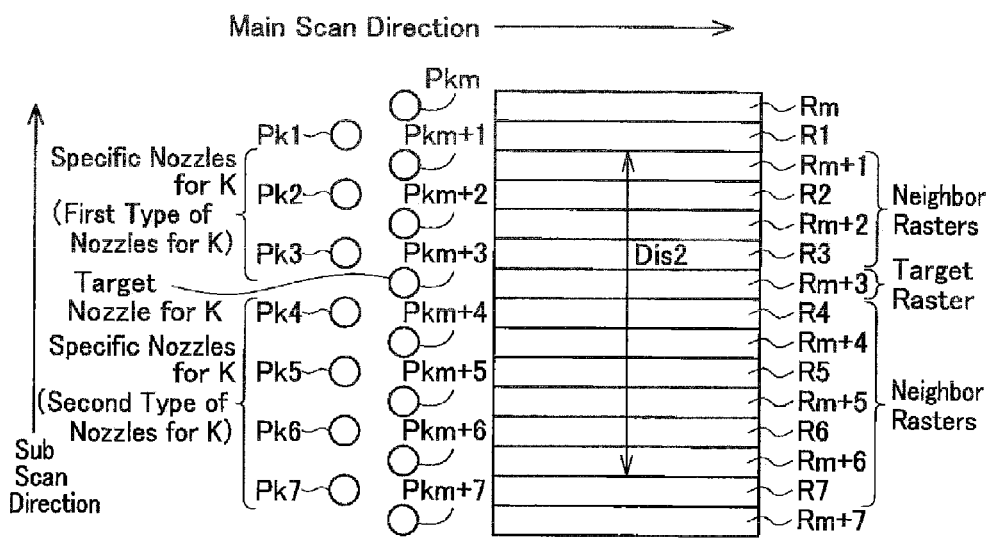
FIG. 6 shows a raster group formed in the second print mode.

The second print mode will be described using the case of black and white printing as an example. As shown in FIG. 5, in the second print mode, the print performing unit 70 first performs the first main scan of the print head 80 to perform print on a part 152 of a print medium 150. The part 152 is a part of the print medium 150 positioned at the most downstream side in the sub scan direction. For example, if n is an odd number, in the first main scan, the (n+1)/2 nozzles for K Nkm to Nkn present at the upstream side in the sub scan direction (the lower side of FIG. 5) from among the n nozzles for K Nk1, etc. form (n+1)/2 rasters on the part 152. The aforementioned "m" is (n+1)/2. FIG. 6 shows how eight nozzles for K Nkm to Nkm+7 (FIG. 6 shows the projection points Pkm to Pkm+7) of the (n+1)/2 nozzles for K Nkm to Nkn form eight rasters Rm to Rm+7 in the first main scan.

Next, the print performing unit 70 transports the print medium 150. In the second print mode, a second distance is adopted as the transportation distance. For Example, if n is an odd number, the second distance is the distance n/2 nozzle pitches. As shown in FIG. 6, when this transportation is performed, each of (n−1)/2 nozzles for K Nk1 to Nkm−1 present at the downstream side in the sub scan direction (the upper side of FIG. 5) is positioned between two adjacent rasters (e.g., Rkm and Rkm+1) formed by the first main scan. In this state, the print performing unit 70 performs the second main scan of the print head 80. Each of the (n−1)/2 nozzles for K Nk1 to Nkm−1 thereby forms one new raster between two adjacent rasters formed by the first main scan on the part 152 of the print medium 150. FIG. 6 shows how seven nozzles for K Nk1 to Nk7 (FIG. 6 shows the projection points Pk1~Pk7) of the (n−1)/2 nozzles for K Nk1 to Nkm−1 form seven rasters R1 to R7 in the second main scan. Further, in the second main scan, the (n+1)/2 nozzles for K Nkm to Nkn present at the upstream side in the sub scan direction (the lower side of FIG. 5) form (n+1)/2 rasters on a part 154 (see the center of FIG. 5) of the print medium 150. The part 154 is adjacent to the part 152, and is positioned upstream from the part 152 in the sub scan direction.

The print performing unit 70 repeats the combination of transporting the print medium 150 by the second distance and performing the main scan of the print head 80. For example, in a third main scan, each of the (n−1)/2 nozzles for K Nk1 to Nkm−1 thereby forms one raster between two adjacent rasters formed by the second main scan on the part 154 of the print medium 150. Further, in the third main scan, the (n+1)/2 nozzles for K Nkm to Nkn form (n+1)/2 rasters on a part 156 (rightmost in FIG. 5) of the print medium 150. The part 156 is adjacent to the part 154, and is positioned upstream from the part 154 in the sub scan direction. The print performing unit 70 repeats the combination of transporting the print medium by the second distance and performing the main scan of the print head 80. An image represented by the binary data is thereby printed on the print medium. Moreover, except for the use of the other color nozzle groups 84c, etc., the second print mode in the case of color printing is identical to the case of black and white printing.

As is clear from the above description, in the second print mode, the distance between two adjacent rasters is approximately ½ nozzle pitch. The second print resolution is two times the first print resolution in the sub scan direction. The second print resolution can also be expressed as "a print resolution that the distance between two adjacent rasters is approximately ½ nozzle pitch." Moreover, a print corresponding to the second print mode may be termed "interlaced print" below.

(Binary Data Generating Process of PC 10)

Next, a process performed by the controlling unit 30 of the PC 10 will be described. The user can select desired data, and perform an operation on the operating unit 12 for printing an image represented by the data. The aforementioned operation includes an operation for the user to select one print resolution from among the first print resolution and the second print resolution. Moreover, in the present embodiment, the contents of the process will be described using a case where the user has selected RGB bitmap format image data (termed "RGB image data" below). If data of another format (e.g., text data, bitmap format image data other than RGB, composite text and bitmap data, etc.) has been selected, the controlling unit 30 converts the data selected by the user into RGB image data using a known technique. When the above operation is performed, the controlling unit 30 performs the binary data generating process of FIG. 7 in accordance with the printer driver 24.

The image process unit 32 acquires the RGB image data, and stores the RGB image data in the work area 22 (S10). Next, the controlling unit 30 sends a predetermined command to the printer 50 for acquiring the characteristic data table 60 stored in the printer 50. The printer 50 sends the characteristic data table 60 stored in the storing unit 56 to the PC 10 in accordance with the predetermined command. Consequently, the controlling unit 30 acquires the characteristic data table 60 (S12). The controlling unit 30 stores the characteristic data table 60 in the work area 22.

Next, using a known technique, the image process unit 32 performs a resolution conversion process on the RGB image data so as to generate converted RGB image data (S14). In S14, the image process unit 32 converts the RGB image data to the resolution corresponding to the print resolution selected by the user. That is, in a case where the user has selected the first print resolution, converted RGB image data corresponding to the first print resolution is generated, and in a case where the user has selected the second print resolution, converted RGB image data corresponding to the second print resolution is generated. Converted RGB image data 200 shown in FIG. 8 is obtained by the resolution conversion process. The pixels 201, 202, 206, 207, etc, within the converted RGB image data 200 include an R value (e.g., R (i, j)), a G value (e.g., G (i, j)), and a B value (e.g., B (i, j)). The R value, G value, and B value are each 256 tone (0 to 255) multi-value data. Moreover, of coordinates indicated within the pixels, an x coordinate indicates a row number of each pixel, and a y coordinate indicates a line number of each pixel.

Next, using a known technique, the color conversion process unit 34 (FIG. 1) performs a color conversion process (S16). In S16, the color conversion process unit 34 converts the converted RGB image data 200 into CMYK bitmap format image data (termed "CMYK image data" below), CMYK image data 210 in FIG. 9 is obtained by the color conversion process. One pixel (e.g., pixel 211) written in CMYK format is obtained from one pixel (e.g., pixel 201) within the converted RGB image data 200. Consequently, a number of pixels of the CMYK image data 210 is identical to a number of pixels of the converted RGB image data 200. The pixels 211, 212, 216, 217, etc. within the CMYK image data 210 include a C value (e.g., C (i, j)), an M value (e.g., M (i, j)), a Y value (e.g., Y (i, j)), and a K value (e.g., K (i, j)). The C value, M value, Y value, and K value are each 256 tone (0 to 255) multi-value data. Further, of coordinates indicated within the pixels, an x coordinate indicates a row number of each pixel, and a y coordinate indicates a line number of each pixel.

Next, the halftone process unit 40, etc. (FIG. 1) performs a halftone process using the CMYK image data 210. The halftone process includes the processes S18~S40. First, the correcting unit 42 (FIG. 1) of the halftone process unit 40 specifies one pixel within the CMYK image data 210 (S18). The sequence for specifying one pixel in S18 is predetermined. Specifically, in a first process of S18, the correcting unit 42 specifies, from among the CMYK image data 210, one pixel belonging to a leftmost row from among a plurality of pixels belonging to the topmost line of FIG. 9. In a second process and subsequent processes of S18, the correcting unit 42 specifies one pixel belonging to the same line as the pixel specified previously (termed "previous specific pixel" below) and belonging to a row neighboring the previous specific pixel to the right. Moreover, when the previous specific pixel belongs to a rightmost row, the correcting unit 42 specifies one pixel belonging to a leftmost row, from among a plurality of pixels belonging to a line one below that of the previous specific pixel.

Figure 10:
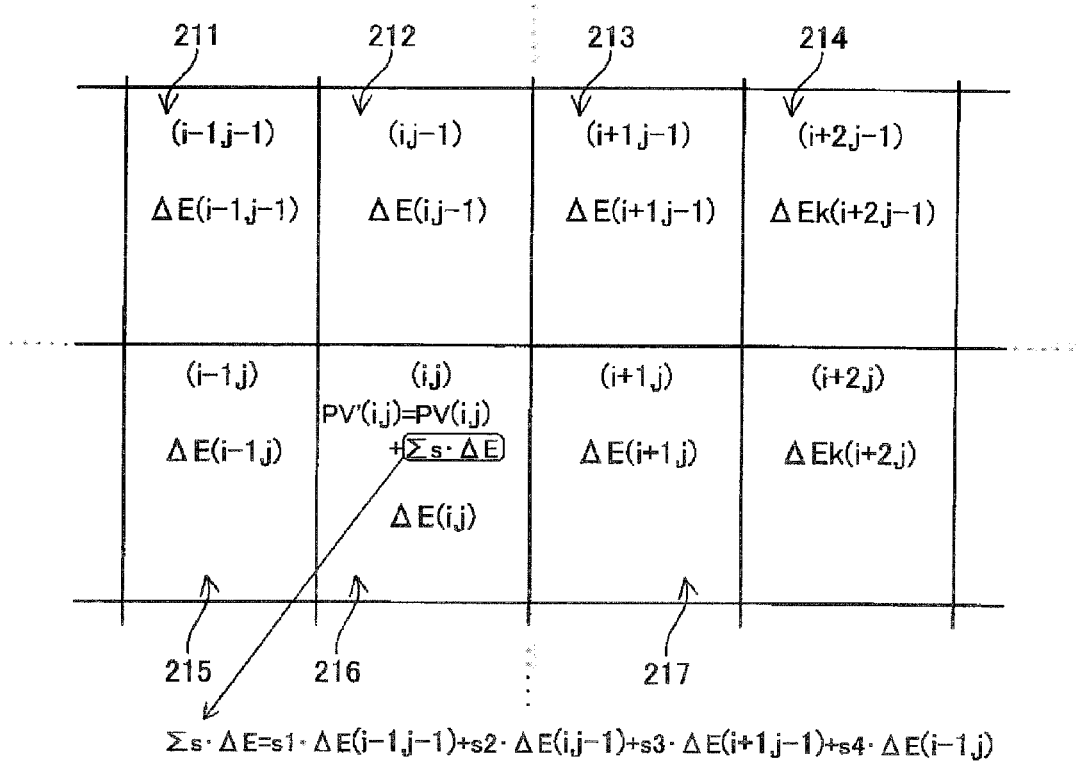
FIG. 10 shows error values of pixels within the CMYK image data.

Below, the one pixel specified in S18 is termed a "target pixel." The correcting unit 42 specifies one value (e.g., the K value) from among the four values CMYK constituting the target pixel (S20). Below, the one value specified in S20 is termed "PV (Pixel Value)." Next, the correcting unit 42 corrects the PV specified in S20 (S22). Specifically, the correcting unit 42 corrects the PV of the target pixel using a plurality of error values calculated for a plurality of neighbor pixels positioned neighboring the target pixel from among the processed pixel group for which the processes S20 to S36 have been completed before those of the target pixel. For example, if the target pixel is the pixel 216 of FIG. 10, the processes S20 to S36 have been completed for the pixels 211 to 215. Consequently, four error values corresponding to CMYK are calculated for each of the pixels 211 to 215 in S34 (to be described). For example, for the pixel 211, an error value corresponding to C, an error value corresponding to M, an error value corresponding to Y, and an error value corresponding to K are calculated. Moreover, in FIG. 10, for convenience, the four error values corresponding to the four colors CMYK are not differentiated, but are represented as "ΔE." Moreover, below, e.g., an error value corresponding to K may be represented as "ΔEk." In the present embodiment, the four pixels 211, 212, 213, 215 positioned to the upper left, atop, upper right, and left of the target pixel 216 are adopted as the neighbor pixels of the target pixel 216. In another embodiment, the pixel to the left of the target pixel 211, the pixel a top the pixel 212, the pixel 214, and the pixel to the left of the pixel 215, etc. may further be adopted as the neighbor pixels of the target pixel 216.

The correcting unit 42 specifies one error value (e.g., the error value ΔEk (i−1, j−1) corresponding to K) corresponding to the color (e.g., K) of the PV of the current correction object from among the four error values ΔE (i−1, j−1) calculated for the one neighbor pixel 211 from among the four neighbor pixels 211, 212, 213, 215 of the target pixel 216. Similarly, for each of the other three neighbor pixels 212, 213, 215, the correcting unit 42 specifies one error value corresponding to the color of the PV of the current correction object from among the four error values calculated for those neighbor pixels. Consequently, the four error values corresponding to the color of the PV of the current correction object are specified. Next, the correcting unit 42 corrects the PV of the target pixel 216 using the four specified error values according to a formula shown within the pixel 216 of FIG. 10 so as to calculate a corrected pixel value PV'. Moreover, s1, s2, s3, s4 within the formula are predetermined coefficients corresponding to the positional relationship between the target pixel 216 and the neighbor pixels. For example, if the PV (i, j) of the target pixel 216 is the K value (K (i, j)), the correcting unit 42 multiplies the error values ΔEk of the neighbor pixels (e.g., ΔEk (i−1, j−1) of the neighbor pixel 211) by the coefficients corresponding to the neighbor pixels (e.g., s1 corresponding to the neighbor pixel 211) so as to calculate a multiplication value for each of the four neighbor pixels 211, 212, 213, 215. Next, the correcting unit 42 adds the K value (i, j) (i.e., the PV (i, j)) of the target pixel 216 to the four multiplication values calculated for the four neighbor pixels 211, 212, 213, 215 so as to calculate a corrected value K' (i, j) (i.e., the PV' (i, j)).

Next, the determining unit 44 (FIG. 1) determines whether the corrected pixel value PV' (e.g., K' (i, j)) obtained in S22 is greater than a predetermined threshold Th (e.g., 128) (S24). If YES, the determining unit 44 determines to form a dot of the color corresponding to the corrected pixel value PV' of the determined object on the print medium. Next, the determining unit 44 stores a new pixel value in the same position in the work area 22 (S26). The value stored here is a dot output value "1" of the color corresponding to the corrected pixel value PV'. For example, if the corrected pixel value PV' of the target pixel 216 is K' (i, j), in S26 the determining unit 44 stores "K=1" in the work area 22 as the new pixel value in the same position as the target pixel. When the binary data including this type of information is supplied to the printer 50, a black ink droplet is discharged to a position corresponding to the target pixel 216 on the print medium. Consequently, a black dot is formed at the position corresponding to the target pixel 216 on the print medium. Upon ending S26, the halftone process proceeds to S30.

In the case of NO in S24, the determining unit 44 determines to form a dot of the color corresponding to the corrected pixel value PV' of the determined object on the print medium. Next, the determining unit 44 stores a new pixel value in the same position as the target pixel in the work area 22 (S28). The value stored here is a dot output value "0" of the target color corresponding to the corrected pixel value PV'. For Example, if the corrected pixel value PV' of the target pixel 216 is K' (i, j), in S28 the determining unit 44 stores "K=0" in the work area 22 as the new pixel value in the same position as the target pixel. When the binary data including this type of information is supplied to the printer 50, a black ink droplet is not discharged to a position corresponding to the target pixel 216 on the print medium. I.e., a black dot is not formed at the position corresponding to the target pixel 216 on the print medium. When S28 ends, the process skips S30 and S32 and proceeds to S34.

Moreover, e.g., if the C value is specified as the PV in S20, "C=1" is stored in S26 as a new pixel value in the same position as the target pixel, and "C=0" is stored in S28 as a new pixel value in the same position as the target pixel. In the former case, a cyan dot is formed on the print medium in a position corresponding to the target pixel, and in the latter case a cyan dot is not formed on the print medium in the position corresponding to the target pixel. If the M value or Y value is specified in S20, as well, a process is performed as in the case where the K value or C value was specified in S20.

In S30, the halftone process unit 40 specifies a nozzle number (termed "target nozzle number" below) of a nozzle (termed "target nozzle" below) that forms a dot of a color (e.g., K) corresponding to the PV' at a position corresponding to the target pixel (e.g., the pixel 216) on the print medium. Next, the halftone process unit 40 specifies a nozzle number (termed "specific nozzle number" below) of a nozzle (termed "specific nozzle" below) that forms a neighbor raster positioned near the raster formed by the target nozzle. Moreover, e.g., if the color corresponding to the PV' is K, the nozzle for K is specified as the target nozzle. Below, a case of the nozzle for K being specified as the target nozzle is termed a "target nozzle for K." Similarly, the case of the nozzle for K being specified as the specific nozzle is termed a "specific nozzle for K." The technique for specifying a nozzle number of a target nozzle for K (termed "number of a target nozzle for K" below) and a nozzle number of a specific nozzle for K (termed "number of a specific nozzle for K" below) will be described in detail next.

First, a process performed by the halftone process unit 40 when the user has selected the first print mode corresponding to the first print resolution will be described (i.e., when the CMYK image data 210 of the first print resolution has been generated in S16). As described above, the first print mode corresponding to the first print resolution is performed as shown in FIG. 4. I.e., in the first main scan, the nozzles for K Nk1 to Nkn form a raster corresponding to lines 1 to n of the CMYK image data 210 of the first print resolution. Further, the transportation distance of the first print mode (the first distance) is the distance of n nozzle pitches. Based on above contents, the target nozzle for K that forms rasters corresponding to a line L of the CMYK image data 210 of the first print resolution may be specified. A first number table of nozzles for K for specifying the number of the target nozzle for K from the line number of the pixels of the CMYK image data 210 of the first print resolution is registered in advance in the printer driver 24 (FIG. 1). If the user has selected the first print resolution, the halftone process unit 40 specifies the number of the target nozzle for K based on the line number of the target pixel within the CMYK image data 210, and the first number table of the nozzles for K.

Next, the halftone process unit 40 specifies the number of the specific nozzle for K. If the line number of the target pixel is L, the halftone process unit 40 specifies a total of five numbers of the specific nozzles for K based on the line numbers L−1, L−2, L+1, L+2, L+3, and the first number table of the nozzles for K.

For example, if the target nozzle for K is the nozzle for K Nk4 (L=4) (FIG. 4), i.e., the number of target nozzle for K is "Nk4", the halftone process unit 40 specifies five numbers of the specific nozzles for K corresponding to the five nozzles Nk2 (L−2), Nk3 (L−1), Nk5 (L+1), Nk6 (L+2), Nk7 (L+3). In the sub scan direction, two nozzles for K Nk2, Nk3 are positioned downstream from the target nozzle for K Nk4, and three nozzles for K Nk5, Nk6, Nk7 are positioned upstream from the target nozzle for K Nk4. As is clear from FIG. 4, the target nozzle for K Nk4 forms one raster R4 (termed "target raster" below), and the five specific nozzles for K Nk2, Nk3, Nk5, Nk6, Nk7 form five rasters R2, R3, R5, R6, R7 neighboring the target raster R4 respectively. That is, the halftone process unit 40 specifies five numbers of the specific nozzles for K corresponding to the five specific nozzles for K Nk2, etc. that form the five rasters R2, etc. neighboring the target raster R4. Moreover, of the aforementioned neighboring five rasters R2, etc., the two rasters R3, R5 are adjacent to the target raster R4.

Figure 7:
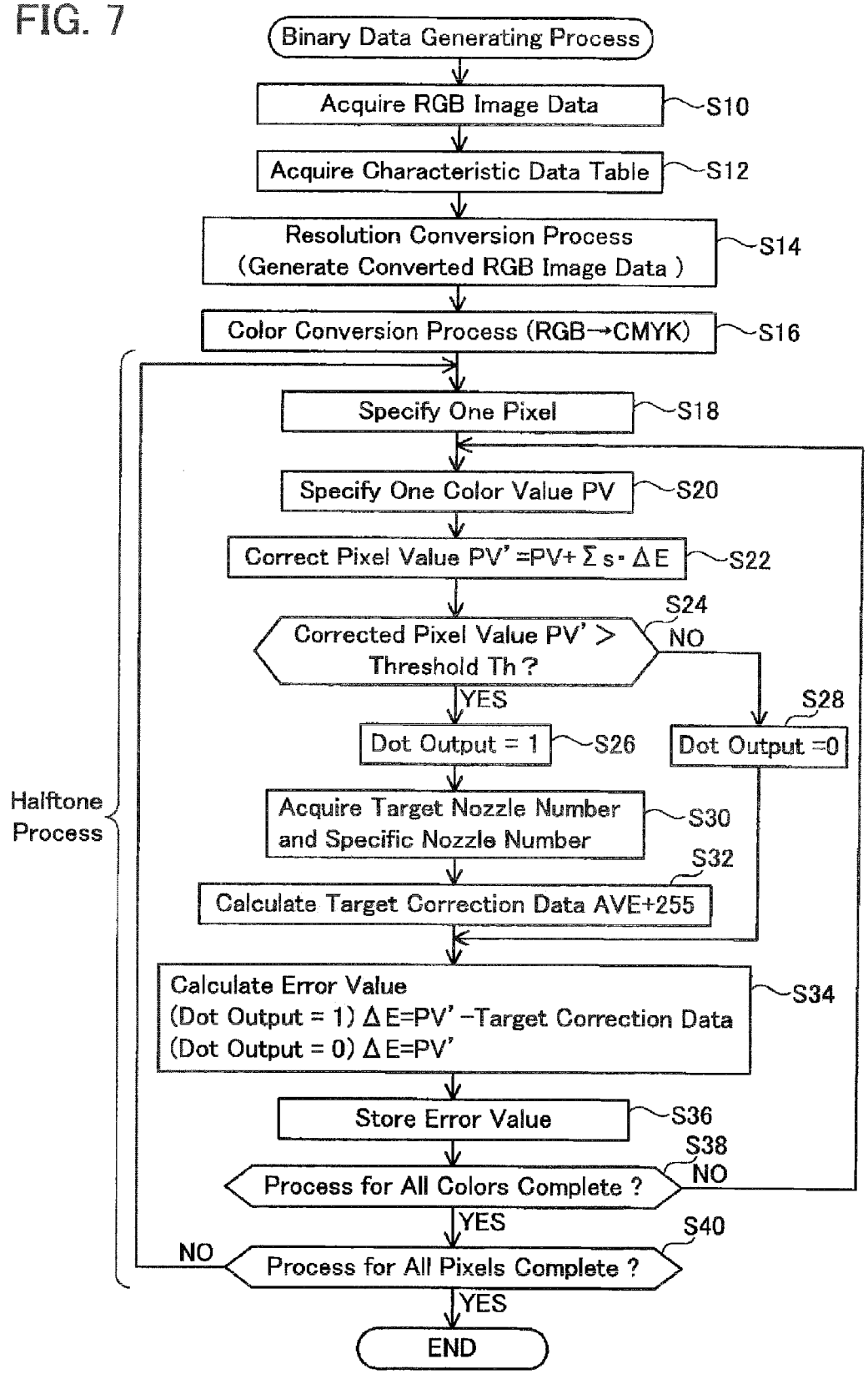
FIG. 7 shows a flowchart of a binary data generating process performed by a PC.

As described above, when the target pixels is specified from the CMYK image data 210 in S18 of FIG. 7, the target pixels are specified in the sequence from top to bottom of FIG. 9. Consequently, at the step of performing the processes S20 to S36 for the target pixels belonging to the line L of the CMYK image data 210, the error values are calculated for the pixels belonging to the lines L−1 and L−2, and the error values are not yet calculated for the pixels belonging to the lines L+1 to L+3. Consequently, the five specific nozzles for K Nk2, etc. include the two specific nozzles for K Nk2, Nk3 that form the rasters R2, R3 corresponding to the pixels belonging to the lines L−1 and L−2 for which error values have been calculated, and the three specific nozzles for K Nk4~Nk6 that form the rasters R4 to R6 corresponding to the pixels belonging to the lines L+1 to L+3 for which error values have not yet been calculated. Below, specific nozzles for K that form rasters corresponding to pixels for which error values have been calculated are called "first type of nozzles for K," and specific nozzles for K that form rasters corresponding to pixels for which error values have not yet been calculated are called "second type of nozzles for K." In the present embodiment, among the five specific nozzles for K Nk2, etc., the number of second type of the nozzles for K Nk4 to Nk6 (i.e. "3") is greater than the number of first type of the nozzles for K Nk2, Nk3 (i.e. "2").

In the first print mode, the halftone process unit 40 specifies the five specific nozzles for K corresponding to the line numbers L−1, L−2, L+1~L+3. For example, if L=2, since the line number L−2 becomes the line number zero, the halftone process unit 40 cannot specify a specific nozzle for K corresponding to the line number L−2. In this case, instead of specifying the five specific nozzles for K, the halftone process nit 40 specifies only four specific nozzles for K corresponding to the line numbers L−1, L+1~L+3. Similarly, if L=1, the halftone process unit 40 specifies only three specific nozzles for K corresponding to the line numbers L+1 to L+3. Further, e.g., if L=n (the total number of nozzles for K), since the line numbers L+1 to L+3 become greater than n, the halftone process unit 40 cannot specify the specific nozzles for K corresponding to the line numbers L+1 to L+3. In this case, the halftone process unit 40 specifies only two specific nozzles for K corresponding to the line numbers L−1, L−2. Similarly, if L is n−1 or n−2, the halftone process unit 40 specifies only three or four specific nozzles for K which can be specified from the first number table of the nozzles for K.

Next, a process performed by the halftone process unit 40 when the user has selected the second print mode corresponding to the second print resolution will be described (i.e., when the CMYK image data 210 of the second print resolution has been generated in S16). As described above, the second print mode corresponding to the second print resolution is performed as shown in FIG. 6. That is, if n is, e.g., an odd number, the nozzles for K Nkm to Nkn form a raster in the first main scan that corresponds to an odd numbered line among the lines 1 to n of CMYK image data 210 of the first print resolution. Further, if n is e.g., an odd number, the transportation distance of the second print mode (the second distance) is the distance n/2 nozzle pitches. Based on above contents, the target nozzle for K that forms the raster corresponding to the line L of the CMYK image data 210 of the second print resolution can be specified. A second number table of nozzles for K for specifying the number of the target nozzle for K from the line numbers of the CMYK image data 210 corresponding to the second print resolution has been registered in advance in the printer driver 24 (FIG. 1). The controlling unit 30 specifies the number of the target nozzle for K based on the line number of the target pixel within the CMYK image data 210, and the second number table of nozzles for K.

Next, the halftone process unit 40 specifies the specific nozzle number. If the line number of the target pixel is L, the halftone process unit 40 specifies numbers of four specific nozzles for K based on the four line numbers L−4 to L−1, and the second number table of the nozzles for K. These four numbers of the four specific nozzles for K correspond to the first type of the nozzles for K. Further, the halftone process unit 40 specifies numbers of seven specific nozzles for K based on the seven line numbers L+1 to L+7, and the second number table of the nozzles for K. These seven numbers of the seven specific nozzles for K correspond to the second type of the nozzles for K. The halftone process unit 40 specifies, in total, eleven numbers of eleven specific nozzles for K.

For example, if the target nozzle for K is the nozzle for K Nkm+3 of FIG. 6 (the projection point Pkm+3 is shown in FIG. 6), the halftone process unit 40 specifies eleven numbers of eleven specific nozzles for K corresponding to the eleven specific nozzles for K that form the eleven rasters R2 to R7, Rm+1, Rm+2, Rm+4 to Rm+7 neighboring the target raster Rm+3. The two rasters R3, R4 Of the aforementioned neighboring eleven rasters R2, etc. are adjacent to the target raster Rm+3. As described above, in FIG. 6, Rm to Rm+7 are formed in the first main scan, and the rasters R1 to R7 are formed in the second main scan. Consequently, the eleven specific nozzles for K include the nozzles for K Nk3, Nk4 that form the adjacent rasters R3, R4 formed by the second main scan, which are adjacent to the target raster Rm+3 formed by the first main scan. In the case of the above example, the four nozzles for K Nkm+1, Nkm+2, Nk2, Nk3 are the first type of the nozzles for K, and the seven nozzles for K Nk4 to Nk7, Nkm+4 to Nkm+6 are the second type of the nozzles for K. In the second print mode, as well, the number of second type of nozzles for K (i.e. "7") is greater than the number of first type of nozzles for K (i.e. "4"). Further, as with the first print mode in the case where L is 4 or less, or in the case where L is n−6 or more, the halftone process unit 40 specifies only specific nozzle groups for K which can be specified from the second number table of the nozzles for K.

As shown in FIG. 4, in the first print mode, a width of the six rasters R2 to R7 (width in the sub scan direction) formed by the one target nozzle Nk4 and the five specific nozzles for K Nk2, etc. is Dis1. Further, as shown in FIG. 6, in the first print mode, a width of the twelve rasters Rm+1 to Rm+6, R2 to R7 (width in the sub scan direction) formed by the one target nozzle Nkm+3 and the eleven specific nozzles for K Nkm+1, etc. is Dis2. Dis1 and Dis2 are approximately equal. Strictly, when comparing Dis1 and Dis2, Dis2 is greater than Dis1 by Rm+1 of FIG. 6.

For each of the three types of chromatic color CMY, first and second number tables of nozzles similar to the first and second number tables of the nozzles for K are registered in advance in the printer driver 24. If the color corresponding to the PV specified in S20 is any of the three types of chromatic color CMY, the halftone process unit 40 specifies the target nozzle number and the specific nozzle number as in the case of K. For example, if the color corresponding to the PV specified in S20 is C, the halftone process unit 40 specifies, using a first or second number table of nozzles for C, a number of one target nozzle for C, and numbers of five (in the case of the first print mode) or eleven (in the case of the second print mode) specific nozzle for C.

When S30 of FIG. 7 ends, the halftone process proceeds to S32. The characteristic data table 60 (FIG. 3) acquired from the printer 50 in S12 is stored in the work area 22. For example, if the color corresponding to the PV specified in S20 is K, in S32 the acquiring unit 36 (FIG. 1) acquires, from the characteristic data table 60, one set of characteristic data corresponding to one number of target nozzle for K specified in S30. Further, in the case of the first print mode, the acquiring unit 36 acquires, from the characteristic data table 60, five sets of characteristic data corresponding to the five numbers of the five specific nozzles for K specified in S30. In this case, the acquiring unit 36 acquires, in total, six sets of characteristic data. Similarly, in the case of the second print mode, the acquiring unit 36 acquires, from the characteristic data table 60, twelve sets of characteristic data corresponding to the twelve numbers of the twelve nozzles for K specified in S30 (one number of the target nozzle for K and the eleven numbers of the eleven specific nozzles for K). Moreover, if the color corresponding to the PV specified in S20 is another color (e.g., C), the acquiring unit 36 acquires, in S32, six or twelve sets of characteristic data corresponding to the six or twelve other color nozzle numbers specified in S30.

Next, the correction data calculating unit 38 (FIG. 1) calculates target correction data. Specifically, the correction data calculating unit 38 calculates a simple average of the characteristic data acquired by the acquiring unit 36 so as to specify an average value (termed "AVE" below). Next, the correction data calculating unit 38 adds 255 to the calculated AVE to calculate the target correction data. For example, in the case of the example of FIG. 4, the correction data calculating unit 38 calculates the AVE of six sets of characteristic data corresponding to the one target nozzle for K Nk4 and the five specific nozzles for K Nk2, Nk3, Nk5 to Nk7. The correction data calculating unit 38 adds 255 to the AVE so as to calculate the target correction data for the target nozzle for K Nk4. Moreover, in the case of the above example, the four nozzles for K Nkm+1, Nkm+2, Nk2, Nk3 are the first type of the nozzles for K, and the seven nozzles for K Nk4 to Nk7, Nkm+4 to Nkm+6 are the second type of the nozzles for K.

Figure 11:
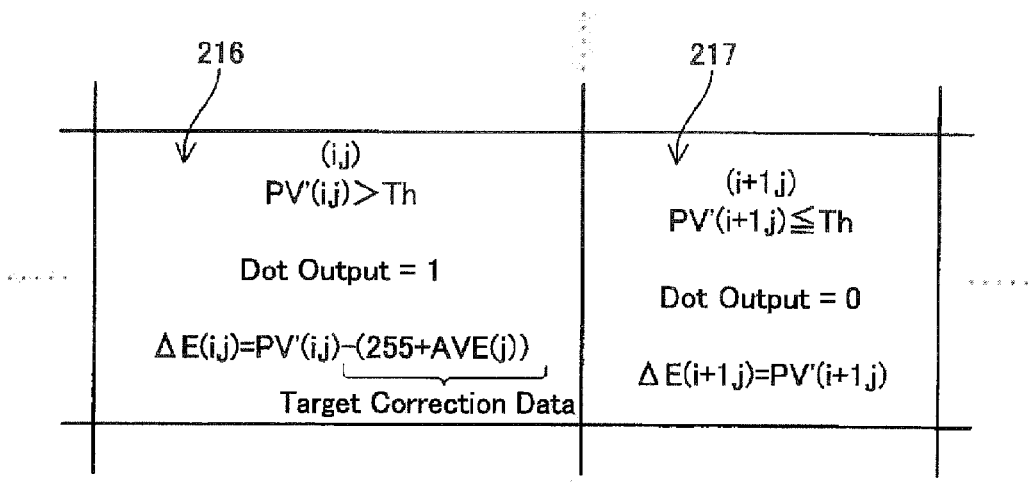
FIG. 11 shows a formula for calculating the error values of pixels within the CMYK image data.

Upon ending S32, the halftone process proceeds to S34. Further, in the case where S28 is performed, S30 and S32 are skipped and the halftone process proceeds to S34. In S34, the error value calculating unit 46 (FIG. 1) calculates error values. The process S34 differs according to the determination results of S24. First, the process S34 will be described for the case where YES was determined in S24 (the case where S26, S30, S32 were performed). The error value calculating unit 46 subtracts the target correction data (255+AVE) obtained in S32 from the corrected pixel value PV' obtained in S22 so as to calculate an error value ΔE. The formula for calculating the error value in this manner is shown within the pixel 216 of FIG. 11. That is, if the target pixel is the pixel 216 of FIG. 11, and the PV' (i, j) obtained in S22 is greater than the threshold Th (the case of YES in S24), the error value calculating unit 46 subtracts the target correction data (AVE (j)+255) from the PV' (i, j) so as to calculate error values ΔE (i, j) corresponding to the pixel 216. Moreover, in the present embodiment, the AVE for the target pixels of a line j is the same value. For example, if the color corresponding to the PV specified in S20 is K, the error value corresponding to K of the pixel 216 is calculated. Similarly, if the color corresponding to the PV specified in S20 is another color, the error value corresponding to the other color of the pixel 216 is calculated. In the case of the example of FIG. 6, i.e., when the interlaced print is performed, the correction data calculating unit 38 calculates the target correction data using characteristic data that includes the characteristic data of the adjacent rasters R3, R4 that are adjacent to the target raster Rm+3. I.e., the error value calculating unit 46 can calculate (i.e. perform the specific process) the error value for the target pixel using the target correction data that has taken into account the discharging amounts of the ink droplets of the adjacent rasters.

Next, the process S34 will be described for the case where NO was determined in S24 (the case where S28 has been performed). In the case of NO in S24, the error value calculating unit 46 specifies the corrected pixel value PV' obtained in S22 as the error value. The formula for calculating the error value in this manner is shown within the pixel 217 of FIG. 11. That is, if the target pixel is the pixel 217 of FIG. 11, and the PV' (i, j) obtained in S22 is smaller than the threshold Th (the case of NO in S24), the error value calculating unit 46 specifies error values ΔE (i+1, j) corresponding to the pixel 217 using the formula within the pixel 217 of FIG. 11. I.e., the error value calculating unit 46 calculates the error values using the corrected pixel value PV', and without using the target correction data (AVE+255).

Upon ending S34, the error value calculating unit 46 stores the error value (e.g., ΔE (i, j)) specified in S30 in the work area 22 as the error value corresponding to the target pixel (S36). The error value stored here is used in the process S22 which is performed later. For example, if the error value ΔE (i, j) corresponding to K of the pixel 216 was stored in S36, this is used in S22 when calculating K' (i, j) corresponding to the K value of the pixel 217.

In S34, for the case where a dot output value=1, the error value ΔE is calculated using the formula ΔE=PV'-target correction data (255+AVE), using the average value AVE of one set of characteristic data corresponding to the target nozzle number, and five sets of characteristic data corresponding to five specific nozzle numbers. Here, the characteristic data corresponding to a nozzle having the minimum discharging amount (termed "minimum characteristic data" below) is "0." This means that the density of a dot formed by the nozzle having the minimum discharging amount is assumed to be "255." That is, using "255+AVE" as the target correction data means that the density of a dot formed by the target nozzle is assumed to be "255+AVE." In S34, the error value ΔE is calculated as the difference between the value PV' of the target pixel that should actually be expressed and the assumed dot density "255+AVE". This difference is diffused to the neighbor pixels by the process S22. Similarly, in S34 for the case where the dot output value=0, the error value ΔE is calculated using the formula ΔE=PV. That is, the error value ΔE is calculated as the difference between the value PV' of the target pixel that should actually be expressed and the density "0" in the case where a dot is not formed. This difference is diffused to the neighbor pixels by the process S22.

Next, the halftone process unit 40 determines whether the processes S20 to S36 have been performed for all four pixel values CMYK (C value, M value, Y value, K value) that constitute the target pixel (S38). In the case of NO, the halftone process unit 40 returns to S20 and, from among the four values CMYK that constitute the target pixel, specifies the values that have not been performed in the processes S20 to S36. In the case of YES in S38, the halftone process unit 40 determines whether the processes S18 to S36 have been completed for all the pixels constituting the CMYK image data 210 (S40). In the case of NO, the halftone process unit 40 returns to S18, and specifies a pixel following the current target pixel (essentially, the right neighboring pixel) as a new target pixel. In the case of YES in S40, the binary data generating process ends.

As is clear from the above description, in the binary data generating process, one new pixel that includes C=0 or 1, M=0 or 1, Y=0 or 1, and K=0 or 1 is generated from one pixel that constitutes the CMYK image data 210. Consequently, the number of pixels of binary data is equal to the number of pixels of CMYK image data 210. The supplying unit 48 (FIG. 1) sends, to the printer 50, the binary data and mode information showing whether the first print mode or second print mode has been selected. Consequently, the print performing unit 70 of the printer 50 performs the print process in accordance with the binary data. That is, the print performing unit 70 supplies a driving signal to the individual electrodes corresponding to the nozzles for K for forming a dot so as to form a black dot on the print medium at a position corresponding to the pixel indicating K=1 included in the binary data. Similarly, the print performing unit 70 supplies a driving signal, in accordance with the binary data, to form other color dots. Consequently, an image represented by the RGB image data acquired in S10 of FIG. 7 (i.e., an image represented by the converted RGB image data 200 obtained in S14, an image represented by the CMYK image data 210 obtained in S16, an image represented by the binary data) is formed on the print medium.

Figure 12:
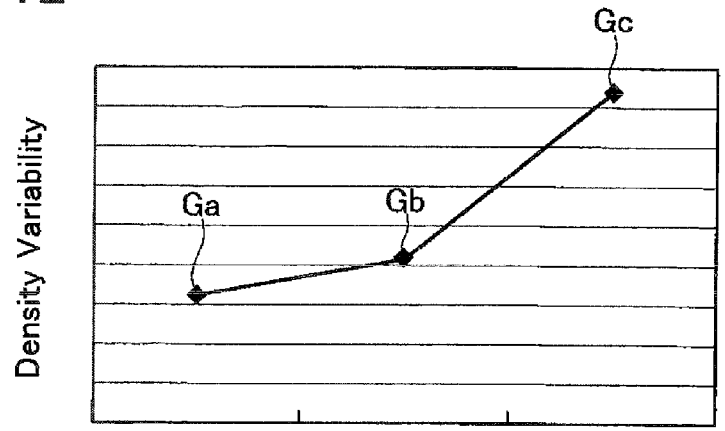
FIG. 12 shows first verification results.

The present embodiment has been described in detail. Results of the present embodiment will be described with reference to FIG. 12 and FIG. 13. FIG. 12 shows first verification results. In the first verification, F1 sets of RGB image data that all pixels indicate black color hues is used. The F1 sets of RGB image data have mutually differing densities. Further, in the present verification, a simulation was performed using F2 sets of characteristic data groups for K that simulated a plurality of types of print head 80. In the present verification, the binary data generating process of FIG. 7 was performed for each of the F1 sets of RGB image data. Further, the binary data generating process was performed using each of the F2 sets of characteristic data groups for K. That is, in the present verification, F1×F2 sets of binary data were generated. Next, for each of the F1×F2 sets of binary data, a printed image was simulated using the print head 80 of the characteristic data for K corresponding to the binary data, thus generating simulation image data. That is, in the present verification, F1×F2 sets of simulation image data were generated. Further, each set of simulation image data was demarcated into F3 areas, and the density in each was measured.

Next, the density variability (variance) of the F3 areas was calculated for each set of simulation image data. Consequently, F1×F2 sets of density variability were calculated. Next, the average value of the F1×F2 sets of density variability was calculated. A point Ga in FIG. 12 was plotted from the density variability (termed "first variability" below) calculated in this manner.

In S32 of FIG. 7 of the present embodiment, a simple average of the six sets of characteristic data (the case of the first print mode) was adopted as the AVE. Here, instead of the process S32 of FIG. 7, a first program was prepared for calculating a weighted average of the six sets of characteristic data as the AVE. In this weighted average, one set of characteristic data corresponding to the target nozzle was multiplied by 0.4, and each of the five sets of characteristic data corresponding to the five specific nozzles was multiplied by 0.12. In accordance with the first program, the PC 10 generated F1×F2 sets of binary data from the F1 sets of RGB image data and the F2 sets of characteristic data for K and, as with the above case, generated F1×F2 sets of simulation image data. The average value of density variability of this simulation image data was calculated. A point Gb in FIG. 12 was plotted from the density variability (termed "second variability" below) calculated in this manner.

Further, instead of the process S32 of FIG. 7, a second program was prepared for calculating, as the target correction data, the sum of 255 and the target characteristic data corresponding to only one target nozzle. In accordance with the second program, the PC 10 generated F1×F2 sets of binary data from the F1 sets of RGB image data and the F2 sets of characteristic data for K and, as with the above case, generated F1×F2 sets of simulation image data. The average value of density variability for this case was calculated. A point Gc in FIG. 12 was plotted from the density variability (termed "third variability" below) calculated in this manner.

As is clear from FIG. 12, in the first verification, the first variability obtained by the technique of the present embodiment is the smallest, the second variability is small, and the third variability is the largest. That is, it was determined that the print results obtained by the technique of calculating the simple average AVE had the highest image quality, the print results obtained by the technique of calculating the weighted average AVE had the second highest image quality, and the print results obtained by the technique of calculating the target correction data without using the AVE had the lowest image quality. The PC 10 of the present embodiment can generate binary data capable of obtaining high image quality print results. Moreover, instead of the present embodiment, the second program that calculates the weighted average AVE may be adopted. In this case, also, binary data can be generated that can obtain higher image quality print results than the technique of calculating the target correction data without using the AVE. Moreover, in the case where the technique of calculating the weighted average AVE is adopted, the coefficients by which each of the plurality of sets of characteristic data are multiplied are not limited to the coefficients (0.4 and 0.12) adopted in the second program.

Figure 13:
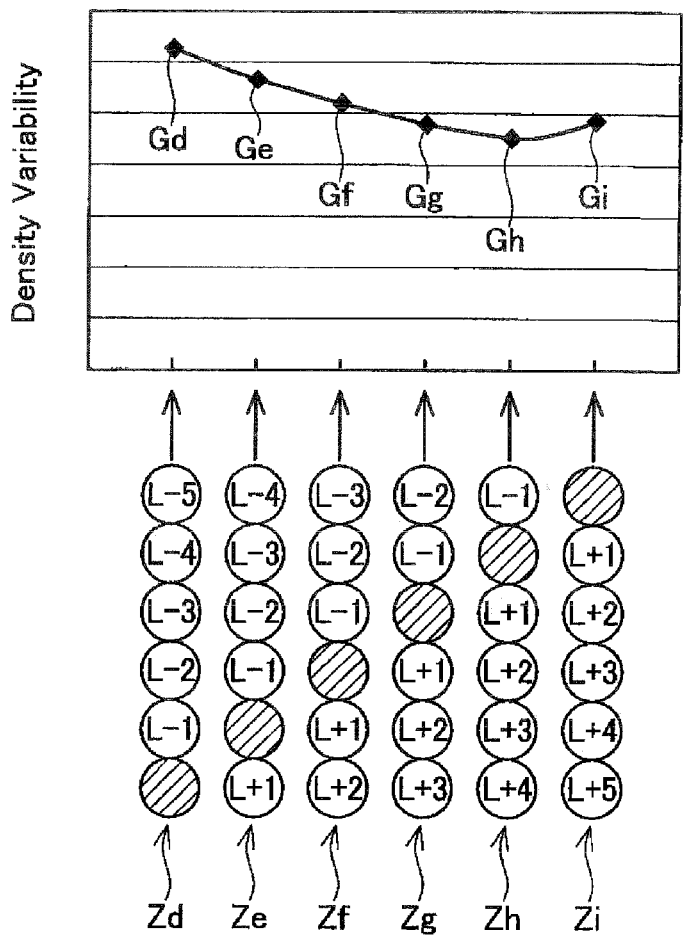
FIG. 13 shows second verification results.

Next, FIG. 13 shows second verification results. In the second verification, density variability was calculated as with the first verification while making various changes to the technique for specifying the specific nozzles for K (see S30 of FIG. 7). That is, in the present verification, the simple average of the six sets of characteristic data was adopted as the AVE. Further, in the present verification, as with the first verification, F1×F2 sets of simulation image data were generated, and the average value of density variability of the F1×F2 sets of simulation image data was calculated. In FIG. 13, the hatched nozzles indicate the target nozzles for K, and the unhatched nozzles indicate the specific nozzles for K. As described above, in the present embodiment, if the target pixel belongs to the line L of the CMYK image data 210, the PC 10 specifies two specific nozzles for K (i.e., two first type of nozzles for K) corresponding to the lines L−1 and L−2, and three specific nozzles for K (i.e., three second type of nozzles for K) corresponding to the lines L+1 to L+3, as shown in number Zg of FIG. 13. The density variability obtained in this case is shown at a point Gg. Further, e.g., if the target pixel belongs to the line L of the CMYK image data 210, as shown with a reference symbol Zd of FIG. 13, the density variability shown by the point Gd is obtained when a technique is adopted to specify the five specific nozzles for K (i.e., the five first type of the nozzles for K) corresponding to the lines L−1 to L−5. Moreover, in the technique of the reference symbol Zd, the second type of the nozzles for K are not specified. Similarly, when techniques to specify the specific nozzle groups for K, as shown by the reference symbols Ze, Zf, Zh, Zi, are adopted, the density variability shown by the points Ge, Gf, Gh, Gi is obtained. As is clear from FIG. 13, when the techniques of the reference symbols Zg, Zh are adopted, in which the number of second type of nozzles for K is greater than the number of first type of nozzles for K, the density variability is smaller than in the techniques of the numbers Ze, Zf in which the number of first type of nozzles for K is greater than the number of second type of nozzles for K. That is, higher image quality print results can be obtained in the case where the number of second type of nozzles for K is greater than the number of first type of nozzles for K. Generally, when the number of second type of nozzles is greater than the number of first type of nozzles, processed image data can be generated that can print a higher image quality image than when the number of first type of nozzles is greater than the number of second type of nozzles. The PC 10 of the present embodiment can generate binary data capable of obtaining high image quality print results. Moreover, instead of the technique of the reference symbol Zg of the present embodiment, a technique of the reference symbol Zh may be adopted that specifies one first type of nozzle for K and four second type of nozzles for K. Further, a technique of the reference symbol Zi may be adopted that specifies five second type of nozzles for K without specifying any first type of nozzles for K.

The PC 10 that includes the controlling unit 30 is an example of the "controlling device." The converted RGB image data 200, the CMYK image data 210, and the binary data generated in FIG. 7 are respectively examples of the "specific image data," "target image data," and "processed image data." Further, the color conversion process and the halftone process are examples of the "image process," and the error value calculation process that is executed in the case where the dot output=1 in S34 of FIG. 7 is an example of the "specific process."

Second Embodiment

In the present embodiment, the contents of the binary data generating process performed by the controlling unit 30 of the PC 10 differ from the first embodiment. The contents of the binary data generating process of the present embodiment will be described with reference to FIG. 14. S10 to S16 are identical to the first embodiment. Upon ending S16, the color conversion process unit 34 performs a correction process to generate corrected image data 250 (FIG. 15) from the CMYK image data 210 (FIG. 9). The correction process includes the processes S50 to S62.

The color conversion process unit 34 specifies one pixel (termed "target pixel" below) from among the CMYK image data 210 (S50). Below, the description will be continued using as an example a case where the pixel 216 is the target pixel. Next, the color conversion process unit 34 specifies one value PV (i, j) from among the four values CMYK that constitute the target pixel 216 (S52). Next, the color conversion process unit 34 performs the process S54 for specifying the target nozzle number and specific nozzle number using a technique similar to S30 of FIG. 7. Upon ending S54, the correction process proceeds to S56.

In S56, the acquiring unit 36 acquires, from the characteristic data table 60, a plurality of sets of characteristic data corresponding to the target nozzle number and the specific nozzle number. Next, the correction data calculating unit 38 calculates the simple average of the plurality of sets of characteristic data acquired by the acquiring unit 36 so as to calculate the AVE. The correction data calculating unit 38 calculates (255+minimum characteristic data)/(255+AVE) so as to calculate target correction data CD (j). Moreover, in the present embodiment, the target correction data for the target pixels of the line j is the same value. The "minimum characteristic data" is characteristic data showing a minimum discharging amount from among the n sets of characteristic data corresponding to the n nozzles of the color corresponding to the PV specified in S52. As described above, in the present embodiment, the "minimum characteristic data" is zero. The color conversion process unit 34 multiplies the target correction data CD (j) by the PV j) so as to calculate a corrected pixel value PV" (i, j) (S58). S60 and S62 are identical to S38 and S40 of FIG. 7 respectively.

Figure 15:
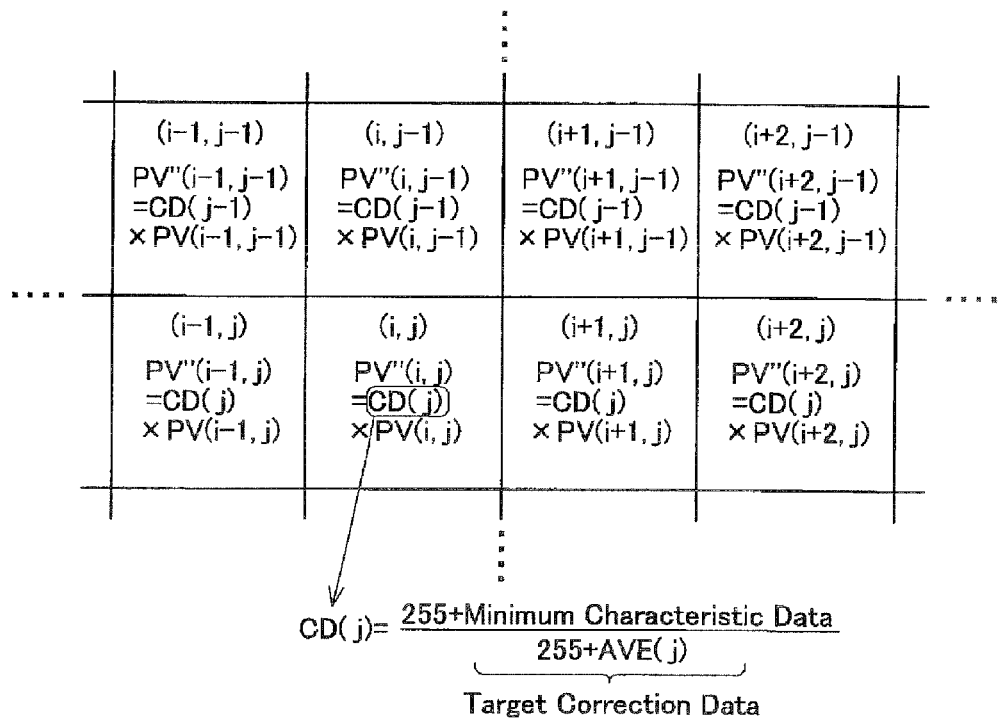
FIG. 15 shows pixels within corrected image data generated in the second embodiment.

The color conversion process unit 34 calculates the corrected pixel value PV" (i, j) for each of the four values CMYK that constitute the target pixel 216. Consequently, based on the target pixel 216, a corrected pixel is generated having four corrected values corresponding to the four colors CMYK. The color conversion process unit 34 generates corrected pixels, in the same manner, for the pixels other than the pixel 216. The corrected image data 250 shown in FIG. 15 is thus obtained. As described above, the color conversion process unit 34 performs the correction process within a CMYK color space so as to generate the corrected image data 250 from the CMYK image data 210.

The halftone process unit 40 performs the halftone process on the corrected image data 250 (S64). The halftone process of the present embodiment differs from the halftone process of FIG. 7 (S18 to S40) in the following points. In S18, the target pixel within the corrected image data 250 is specified and, in S20, one value PV" (the corrected value obtained in S58) is specified from among the four values that constitute the target pixel. In S22, the PV' is calculated by adding the error value (i.e., Σs·ΔE) to the PV" specified in S20. The processes S30, S32 shown in FIG. 7 are not performed. Further, in S34, in the case where the dot output=1, the error value ΔE is calculated by subtracting 255 from the PV'. The other processes are identical to those of the first embodiment.

Figure 14:
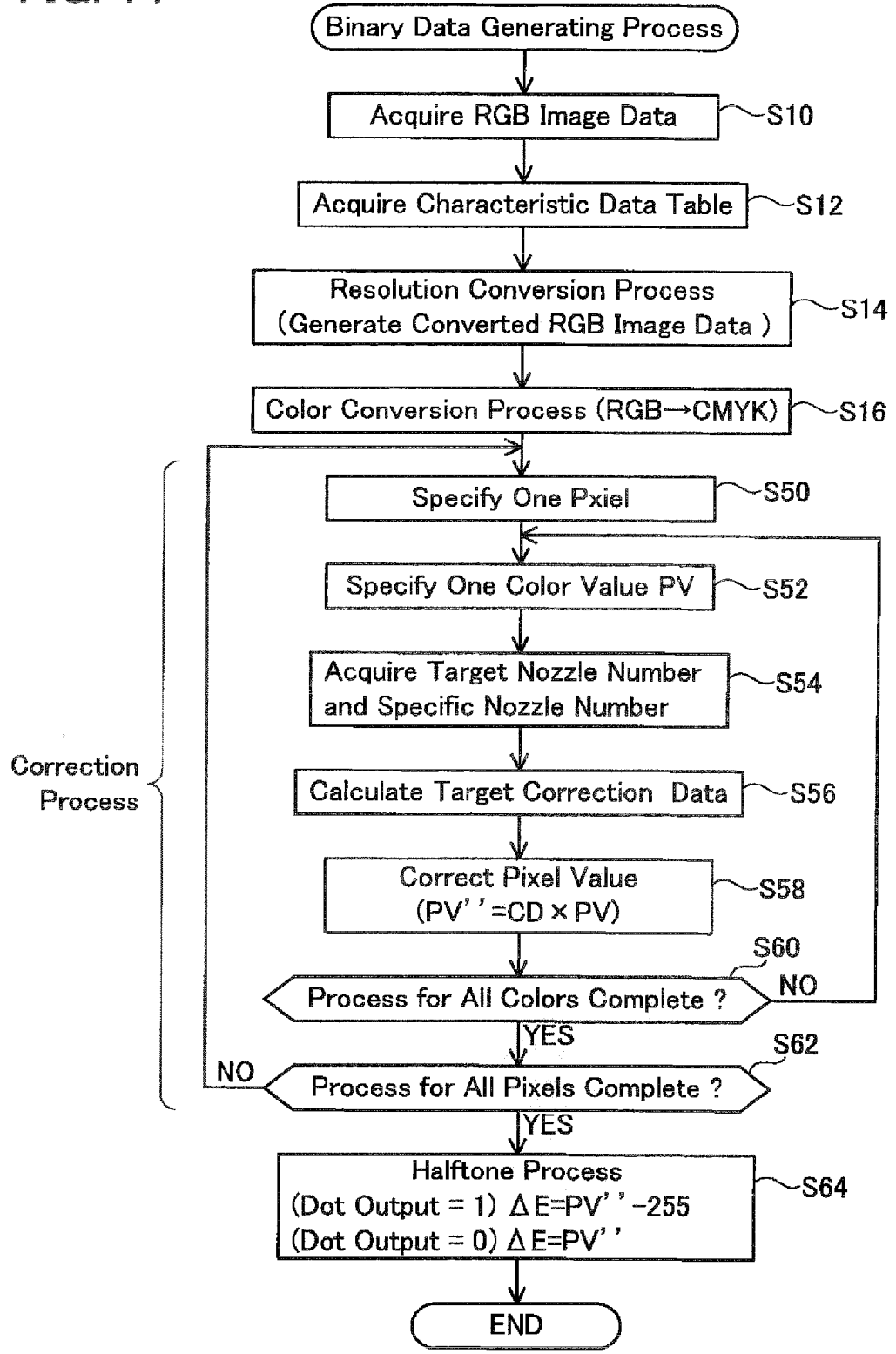
FIG. 14 shows a flowchart of a binary data generating process performed by a PC of a second embodiment.

The second embodiment has been described in detail. In the second embodiment also, results similar to those of the first embodiment can be obtained. Moreover, the converted RGB image data 200 generated in S14 of FIG. 14 is an example of the "specific image data" and "target image data." The corrected image data 250 is an example of the "color converted image data." Further, the color conversion process, correction process, and halftone process are examples of the "image process," and the color conversion process and correction process are examples of the "specific process."

Third Embodiment

In the present embodiment, the print performing unit 70 of the printer 50 may perform a third print mode in addition to the first and second print modes. Below, printing performed using the third print mode may be termed "singling." Moreover, singling can also be called an "overlap method."

Figure 16:
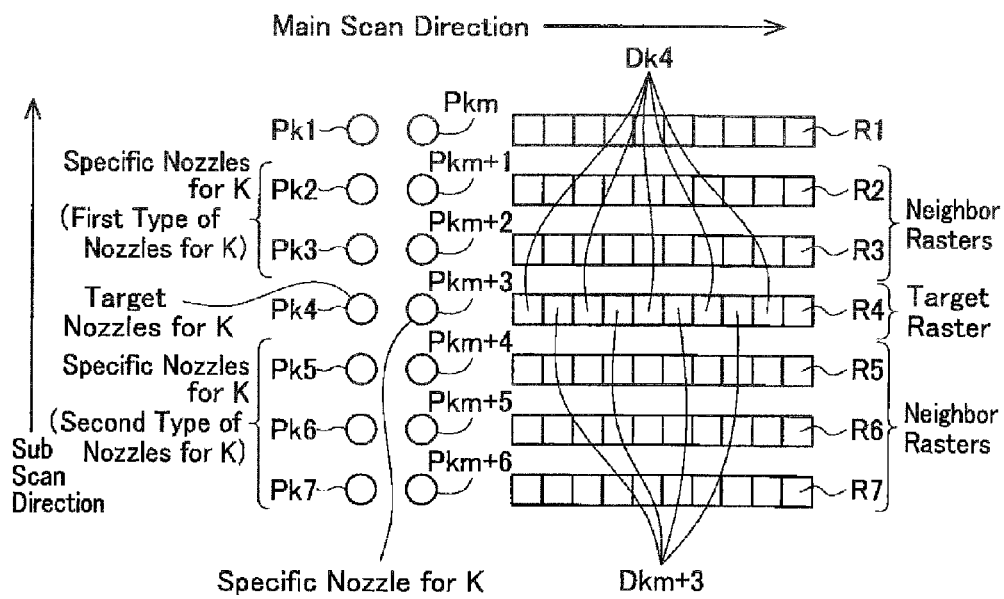
FIG. 16 shows raster group formed in a third print mode of a third embodiment.

The singling of black and white print of the present embodiment will be described with reference to FIG. 16. Moreover, in a case of color printing, singling is performed as with the case of black and white printing, but using the other color nozzle groups 84*c*, etc. in addition to the nozzle group for K 84*k*. In both the first print mode and second print mode of the first embodiment, one nozzle for K forms one raster by one main scan of the print head 80. By contrast, in the singling, two nozzles for K form one raster by two main scans of the print head 80. For example, as shown in FIG. 16, in the first main scan of the print head 80, the nozzle for K Nkm+3 (Pkm+3) forms a dot group Dkm+3. Next, in the second main scan of the print head 80, the nozzle for K Nk4 (Pk4) forms a dot group Dk4. One raster R4 includes the dot group Dkm+3 and the dot group Dk4. As is clear from the above description, in the first main scan, the dot group Dkm+3 is formed in accordance with a first pixel group equivalent to half of a plurality of pixels that constitutes a specific line of the binary data and, in the second main scan, the dot group Dk4 is formed in accordance with a remaining second pixel group that constitutes the specific line. In the specific line of the binary data, the first pixel group and the second pixel group are positioned alternately. I.e., each pixel of the first pixel group is, e.g., a pixel belonging to an even number row, and each pixel of the second pixel group is, e.g., a pixel belonging to an odd number row.

For example, when n is an odd number, in the singling, one nozzle for K Nkn disposed at the most upstream side in the sub scan direction is not used. In the first main scan, each of (n−1)/2 nozzles for K Nkm to Nkn−1 form the first dot group (see the dot Dkm+3 of FIG. 16). Next, the print performing unit 70 transports the print medium 150. In singling, a third distance is adopted as the transportation distance. The third distance is the distance (n−1)/2 nozzle pitches. When this transportation is performed, as shown in FIG. 16, each of the (n−1)/2 nozzles for K Nk1 to Nkm−1 disposed at the downstream side are disposed at the same position as the first dot group in the sub scan direction. For example, the nozzle for K Nk4 (Pk4) is disposed in the same position as the dot Dkm+3. In this state, the print performing unit 70 performs the second main scan of the print head 80. Each of the (n−1)/2 nozzles for K Nk1 to Nkm−1 disposed downstream thereby forms a second dot group (see the dot Dk4 of FIG. 16). An (n−1)/2 raster R1, etc. is constituted by the first dot group and the second dot group. Moreover, in the second main scan, the (n−1)/2 nozzles for K Nkm to Nkn−1 disposed at the upstream side also form a dot group. The print performing unit 70 repeats the combination of transporting the print medium 150 the third distance and the main scan of the print head 80. An image represented by the binary data is thereby printed on the print medium 150.

As is clear from the above description, the print resolution of the singling in the sub scan direction is the same as the first print resolution of the first print mode. However, the print results of singling have a higher image quality than the print results of the first print mode. For example, since one nozzle forms one raster in the first print mode, a difference in the discharging amount of each nozzle appears noticeably as a density difference of each raster. By contrast, in singling, since two nozzles form one raster, a difference in the discharging amount of each nozzle does not readily appear as a density difference of each raster.

In the present embodiment, when a user performs an operation on the operating unit 12 of the PC 10 to print desired image data, the user can select one print mode from among the first, second and third print modes. As described above, in the first embodiment, the first and second nozzle number tables are registered in the printer driver 24. In the present embodiment, in addition to the above tables, four third nozzle number tables corresponding to the four colors CMYK are registered in the printer driver 24. The third nozzle number tables are tables for specifying the target nozzle number from the line number and row number of the target pixel in the case of singling. For example, if one pixel of the pixel groups within the CMYK image data 210 corresponding to the dot group Dkm+3 of FIG. 16 is the target pixel, information that specifies the number of target nozzle for K Nkm+3 is registered in the third number table of nozzles for K. In S30 of FIG. 7, the halftone process unit 40 specifies the number of target nozzle for K using the third number table of nozzles for K. Further, the halftone process unit 40 specifies the numbers of the specific nozzles for K using the third number table of nozzles for K. For example, if the line number of the target pixel is L, and the target nozzle for K is the nozzle for K Nkm+3, the halftone process unit 40 first specifies, from the third number table of nozzles for K, a number of one specific nozzle for K Nk4 that forms the same raster R4 as the target nozzle for K Nkm+3. Further, the halftone process unit 40 specifies numbers of four specific nozzles for K Nk2, Nk3, Nkm+1, Nk+2 (i.e., the first type of the nozzles for K) corresponding to the line numbers L−1, L−2, and specifies numbers of six specific nozzles for K Nk5 to Nk7, Nkm+4 to Nkm+6 (i.e., the second type of the nozzles for K) corresponding to the line numbers L+1, L+2, L+3. That is, the halftone process unit 40 specifies eleven numbers for the eleven specific nozzles for K in total. The remaining processes are identical to the binary data generating process of the first embodiment. Moreover, in the present embodiment, as in the first embodiment, the AVE for each target pixel of e.g., the line j has the same value. In other embodiments, the AVE for each target pixel of e.g., the line j may have differing value. That is, the numbers of specific nozzles for K specified may differ depending on the number of the target nozzle for K.

In the case where binary data corresponding to singling is generated using the binary data generating process of the second embodiment, in S54 of FIG. 14, as in the case of S34 above, the color conversion process unit 34 specifies the target nozzle number and specific nozzle number from the third number table of nozzles for K. Next, the color conversion process unit 34 calculates the target correction data CD (j). In the present embodiment, the target correction data CD (j) for each of the target pixels of e.g., the line j have the same value. In other embodiments, the target correction data for each target pixel of e.g., the line j may have differing value.

Fourth Embodiment

In the above embodiments, the characteristic data table 60 (FIG. 3) is stored in the storing unit 56 of the printer 50. In the present embodiment, the storing unit 56 of the printer 50 stores a correction data table 300 shown in FIG. 17 instead of the characteristic data table 60. For each of the 4n nozzles, target correction data to be used when the nozzle is the target nozzle is registered in the correction data table 300. That is, for the 4n nozzles, when each of the nozzles is the target nozzle, the manufacturer of the printer 50 performs, e.g., the calculations performed in S30 and S32 of FIG. 7 so as to calculate target correction data (255+AVE) for the nozzle. The correction data table 300 is thereby obtained. The manufacturer stores the correction data table 300 in the storing unit 56 of the printer 50.

In the present embodiment, in S12 of FIG. 7, the controlling unit 30 of the PC 10 acquires the correction data table 300 from the printer 50. In S30 of FIG. 7, the halftone process unit 40 specifies only the target nozzle number, and does not specify the specific nozzle number. The halftone process unit 40 does not perform the process S32 of FIG. 7. In S34 of FIG. 7, the acquiring unit 36 acquires the target correction data corresponding to the target nozzle number from the correction data table 300. The other processes are identical to those of the first embodiment. According to this configuration, the controlling unit 30 of the PC 10 does not need to calculate the correction data.

Variants of the aforementioned embodiments are given below.

(1) In the aforementioned embodiments, the PC 10 comprises the controlling unit 30 that includes the image process unit 32 and the supplying unit 48. Instead, the printer 50 may comprise the controlling unit 30. In this case, the printer is an example of the "controlling device."

(2) In the aforementioned embodiments, the PC 10 acquires the characteristic data table 60 from the printer 50 after receiving a print instruction from the user. However, the PC 10 may acquire the characteristic data table 60 from the printer 50 when the printer driver 24 is installed in the PC 10, and may store the characteristic data table 60. Further, the PC 10 may acquire necessary characteristic data (e.g., in the case of the first print mode, six sets of characteristic data corresponding to one target nozzle number and five specific nozzle numbers) from the printer 50 each time S32 of FIG. 7 is performed.

(3) In the aforementioned embodiments, the halftone process unit 40 selects the nozzle that forms the raster adjacent to the target raster as the specific nozzle (S30 of FIG. 7, S54 of FIG. 14). However, the halftone process unit 40 may e.g. select a nozzle that forms the raster at a position separated by one raster from the target raster as the specific nozzle without selecting the nozzle that forms the raster adjacent to the target raster as the specific nozzle. In general, the specific nozzle may include any nozzle that forms a raster near the target raster.

(4) In the aforementioned embodiments, the second print resolution corresponding to the second print mode is two times the first print resolution corresponding to the first print mode. However, the second print resolution may be three times the first print resolution, or greater. For example, if the second print resolution is three times the first print resolution, one raster is formed by the second main scan between two adjacent rasters formed by the first main scan, and one raster is formed by the third main scan between the two adjacent rasters.

(5) In the aforementioned embodiments, the halftone process unit 40 generates binary data that indicates dot output=1, and dot output=0. However, the halftone process unit 40 may generate ternary, or greater, data. For example, the halftone process unit 40 may generate four value data indicating a value "3" corresponding to a large dot, a value "2" corresponding to a medium dot, a value "1" corresponding to a small dot, and "0" corresponding to no dot. In this case, the halftone process unit 40 may use, as the threshold used in S24 of FIG. 7, a threshold Th1 (e.g., 191) for demarcating the large dot and medium dot, a threshold Th2 (e.g., 127) for demarcating the medium dot and small dot, and a threshold Th3 (e.g., 63) for demarcating the small dot and the no dot. In the case of this example, the halftone process unit 40 may change the target correction data calculated in S32 of FIG. 7 in accordance with the dot size to be formed. For example, in the case of forming a medium dot, the halftone process unit 40 may specify (255+AVE)×(density to be expressed as the medium dot)/(density to be expressed as the large dot (e.g., 255)) as the target correction data and, in the case of forming a small dot, may specify (255+AVE)×(density to be expressed as the small dot)/(density to be expressed as the large dot (e.g., 255)) as the target correction data.

(6) In the aforementioned embodiments, the error value calculated in S34 is stored in the work area 22 as the error value corresponding to the target pixel in S36 of FIG. 7. In S22 of FIG. 7, the correcting unit 42 collects the error values stored in S36 (the error values corresponding to pixels neighboring the target pixel) so as to calculate the PV'. Instead of this configuration, in S36, the correcting unit 42 may assign the error values calculated in S34 to unprocessed pixels neighboring the target pixel. For example, if the error value ΔEk (i, j) corresponding to K of the pixel 216 of FIG. 10 has been calculated, the correcting unit 42 may calculate, in S36, the sum of K (i+1, j), which is the K value of the unprocessed pixel 217, and the value from multiplying the error value ΔEk by the coefficient s so as to calculate a new K value of the pixel 217. In a case where this configuration is adopted, the PV specified in S20 of FIG. 7 is identical to the PV', and the process S22 of FIG. 7 is not performed.

(7) In the second embodiment, the halftone process unit 40 performs the halftone process using the error diffusion method. However, the halftone process may instead be performed using the dither method.

(8) In the third embodiment, in singling, two nozzles form one raster by two main scans. However, one nozzle may instead form one raster by two main scans. Further, three or more nozzles may form one raster by three or more main scans.

(9) In the characteristic data table 60 of FIG. 3, for each color CMYK, characteristic data corresponding to the nozzle having the minimum discharging amount is set at zero. However, for example, characteristic data corresponding to a nozzle having a predetermined standard discharging amount may be set at zero. In this case, minus value characteristic data may be present in the characteristic data table 60 of FIG. 3.

(10) In the first embodiment, the number value "255" is adopted for calculating the target correction data (AVE+255) in S32 of FIG. 7. This means that "255" (the greatest value the pixels within the CMYK image data 210 can attain) has been adopted as the density value of the dot formed by the nozzle having the minimum discharging amount. Instead of this configuration, a number value other than "255" may be used as the number value for calculating the target correction data. Further, in the second embodiment, as well, when the target correction data is to be calculated, (255+minimum characteristic data)/(255+AVE) has been adopted. This also means that "255" has been adopted as the density value of the dot formed by the nozzle having the minimum discharging amount. Instead of this configuration, a number value other than "255" may be used as the number value for calculating the target correction data.

(11) In the characteristic data table 60 of FIG. 3, the characteristic data corresponding to the nozzle having the minimum discharging amount may be set at 255. I.e., the characteristic data may be a value obtained by adding 255 to the value shown in FIG. 3. In this case, 255 need not be added to the AVE in S32 of FIG. 7.

(12) In the foregoing embodiment, respective units 32 to 48 are realized as a result of the controlling unit 30 performing the processes according to the program 24. Nevertheless, at least one unit of respective units 32 to 48 may alternately be realized by a hardware resource such as a logic circuit.

The invention claimed is:

1. A computer-implemented method in a system comprising an image processing apparatus and a printer, the printer comprising an ink jet head having a plurality of nozzles and a memory storing a table that contains characteristic data corresponding to each of the plurality of nozzles, each characteristic data being determined in accordance with a difference between an actual discharging amount of an ink droplet from a corresponding nozzle and a reference discharging amount of an ink droplet from the corresponding nozzle, the method comprising:

determining a particular target pixel of image data, the image data comprising a plurality of pixels;

determining a particular pixel value for the particular target pixel;

determining a plurality of specific pixels adjacent to the particular target pixel, each of the plurality of specific pixels being one of the plurality of pixels of the image data;

determining an error value for each of the plurality of specific pixels;

determining a particular corrected pixel value based on the particular pixel value and the determined error values of the plurality of specific pixels;

determining a particular target nozzle, which is one of the plurality of nozzles of the ink jet head, the particular target nozzle corresponding to the particular target pixel;

determining a plurality of specific nozzles adjacent to the particular target nozzle, each of the plurality of specific nozzles being one of the plurality of nozzles of the ink jet head and different from the particular target nozzle, wherein a specific nozzle of the plurality of specific nozzles forms a specific raster different from specific rasters formed by others of the plurality of specific nozzles, and each specific raster is different from a particular target raster formed by the particular target nozzle;

retrieving, from the table stored in the memory, first characteristic data of the particular target nozzle and second characteristic data of each of the plurality of specific nozzles;

determining particular target correction data for the particular target nozzle based on the first characteristic data of the particular target nozzle and the second characteristic data of each of the plurality of specific nozzles;

determining whether the particular corrected pixel value is greater than a threshold value;

determining a particular error value for the particular target pixel;

wherein if the particular corrected pixel value is greater than the threshold value, the particular error value for the particular target pixel is determined by using the particular corrected pixel value and the particular target correction data, and if the particular corrected pixel value is not greater than the threshold value, the particular error value for the particular target pixel is determined without using the particular target correction data such that the particular error value is identical to the particular corrected pixel value; and storing the determined particular error value in the memory in association with the particular target pixel.

2. An image processing apparatus comprising:

a memory storing a table that contains characteristic data corresponding to each of a plurality of nozzles of an ink jet head of a printer, each characteristic data being determined in accordance with a difference between an actual discharging amount of an ink droplet from a corresponding nozzle and a reference discharging amount of an ink droplet from the corresponding nozzle, and a controller configured to:

determine a particular target pixel of image data, the image data comprising a plurality of pixels;

determine a particular pixel value for the particular target pixel;

determine a plurality of specific pixels adjacent to the particular target pixel, each of the plurality of specific pixels being one of the plurality of pixels of the image data;

determine an error value for each of the plurality of specific pixels;

determine a particular corrected pixel value based on the particular pixel value and the determined error values of the plurality of specific pixels;

determine a particular target nozzle, which is one of the plurality of nozzles of the ink jet head, the particular target nozzle corresponding to the particular target pixel;

determine a plurality of specific nozzles adjacent to the particular target nozzle, each of the plurality of specific nozzles being one of the plurality of nozzles of the ink jet head and different from the particular target nozzle, wherein a specific nozzle of the plurality of specific nozzles forms a specific raster different from specific rasters formed by others of the plurality of specific nozzles, and each specific raster is different from a particular target raster formed by the particular target nozzle;

retrieve, from the table stored in the memory, first characteristic data of the particular target nozzle and second characteristic data of each of the plurality of specific nozzles;

determine particular target correction data for the particular target nozzle based on the first characteristic data of the particular target nozzle and the second characteristic data of each of the plurality of specific nozzles;

determine whether the particular corrected pixel value is greater than a threshold value;

determine a particular error value for the particular target pixel; and store the determined particular error value in the memory in association with the particular target pixel;

wherein if the particular corrected pixel value is greater than the threshold value, the particular error value for the particular target pixel is determined by using the particular corrected pixel value and the particular target correction data, and if the particular corrected pixel value is not greater than the threshold value, the particular error value for the particular target pixel is determined without using the particular target correction data such that the particular error value is identical to the particular corrected pixel value.

3. The image processing apparatus as in claim 2, wherein the image data is data for causing the printer to perform interlaced print in which two rasters formed by adjacent nozzles are formed by a first main scan of the ink jet head and one raster is formed by a second main scan of the ink jet head between the two rasters formed by the adjacent nozzles, and the plurality of specific nozzles includes a nozzle which forms a specific raster in the second main scan, the specific raster being adjacent to the particular target raster formed by the particular target nozzle in the first main scan.

4. The image processing apparatus as in claim 2, wherein the particular target correction data is an average of the first characteristic data and the second characteristic data.

5. The image processing apparatus as in claim 2, wherein in a case where the printer is to perform print with a first print resolution, the plurality of specific nozzles includes a first number N1 of nozzles adjacent to the particular target nozzle, in a case where the printer is to perform print with a second print resolution greater than the first print resolution, the plurality of specific nozzles includes a second number N2 of nozzles adjacent to the particular target nozzle, the second number N2 being greater than the first number N1.

6. The image processing apparatus as in claim 5, wherein N1 and N2 are set such that a width of N1 rasters is substantially equal to a width of N2 rasters, the N1 rasters are formed by the N1 nozzles in a case where the printer performs print with the first print resolution, and the N2 rasters are formed by the N2 nozzles in a case where the printer performs print with the second print resolution.

7. The image processing apparatus as in claim 2, wherein the ink jet head comprises a plurality of nozzle rows, each of the plurality of the nozzles belonging to any one of the plurality of nozzle rows, the plurality of nozzle rows including a first nozzle row and a second nozzle row, each of the plurality of nozzle rows extending along a sub scan direction, in the sub scan direction, a particular one of the plurality of nozzles belonging to the second nozzle row is located between two neighboring nozzles belonging to the first nozzle row, the particular target nozzle belongs to the first nozzle row, and each of the plurality of specific nozzles belongs to the first nozzle row.

8. The image processing apparatus as in claim 2, wherein the plurality of specific nozzles includes a first type of a nozzle and a second type of a nozzle, image data being used in the printer for discharging ink from the first type of the nozzle is generated before generating the image data for discharging ink from the particular target nozzle, the first type of the nozzle forms a raster different from a raster formed by the particular target nozzle, image data being used in the printer for discharging ink from the second type of the nozzle is generated after having generated the image data for discharging ink from the particular target nozzle, the second type of the nozzle forms a raster different from a raster formed by the particular target nozzle.

9. The image processing apparatus as in claim 2, wherein the controller is further configured to:

convert a first pixel value of the particular target pixel of the image data to a second pixel value of the particular target pixel, the first pixel value being represented by a first color space, and the second pixel value being represented by a second color space different from the first color space, and the second pixel value being the particular pixel value.

10. A non-transitory computer readable medium including a computer program for an image processing apparatus for causing a printer to perform printing, the printer comprising an ink jet head having a plurality of nozzles and a memory storing a table that contains characteristic data corresponding to each of the plurality of nozzles, each characteristic data being determined in accordance with a difference between an actual discharging amount of an ink droplet from a corresponding nozzle and a reference discharging amount of an ink droplet from the corresponding nozzle, the computer program including instructions for ordering a computer mounted on the controlling device to perform:

determining a particular target pixel of image data, the image data comprising a plurality of pixels;

determining a particular pixel value for the particular target pixel;

determining a plurality of specific pixels adjacent to the particular target pixel, each of the plurality of specific pixels being one of the plurality of pixels of the image data;

determining an error value for each of the plurality of specific pixels;

determining a particular corrected pixel value based on the particular pixel value and the determined error values of the plurality of specific pixels;

determining a particular target nozzle, which is one of the plurality of nozzles of the ink jet head, the particular target nozzle corresponding to the particular target pixel;

determining a plurality of specific nozzles adjacent to the particular target nozzle, each of the plurality of specific nozzles being one of the plurality of nozzles of the ink jet head and different from the particular target nozzle, wherein a specific nozzle of the plurality of specific nozzles forms a specific raster different from specific rasters formed by others of the plurality of specific nozzles, and each specific raster is different from a particular target raster formed by the particular target nozzle;

retrieving, from the table stored in the memory, first characteristic data of the particular target nozzle and second characteristic data of each of the plurality of specific nozzles;

determining particular target correction data for the particular target nozzle based on the first characteristic data of the particular target nozzle and the second characteristic data of each of the plurality of specific nozzles;

determining whether the particular corrected pixel value is greater than a threshold value;

determining a particular error value for the particular target pixel;

wherein if the particular corrected pixel value is greater than the threshold value, the particular error value for the particular target pixel is determined by using the particular corrected pixel value and the particular target correction data, and if the particular corrected pixel value is not greater than the threshold value, the particular error value for the particular target pixel is determined without using the particular target correction data such that the particular error value is identical to the particular corrected pixel value; and storing the determined particular error value in the memory in association with the particular target pixel.

* * * * *